(12) United States Patent
Stanwood et al.

(10) Patent No.: US 7,672,268 B2
(45) Date of Patent: Mar. 2, 2010

(54) SYSTEMS AND METHODS FOR IMPLEMENTING DOUBLE WIDE CHANNELS IN A COMMUNICATION SYSTEM

(76) Inventors: Kenneth Stanwood, 1958 Paseo Del Rey, Vista, CA (US) 92084; Timothy Leo Gallagher, 840 Val Sereno Dr., Encinitas, CA (US) 92024; Sheldon L. Gilbert, 12710 Monterey Cypress Rd., San Diego, CA (US) 92122; Yair Bourlas, 17876 Aguamiel Rd., San Diego, CA (US) 92127; Charles Bergan, 1243 Avocet Ct., Cardiff, CA (US) 92007; Sam A. Liu, 4968 Sterling Grove La., San Diego, CA (US) 92130; Darren Smith, 12710 Torrey Bluff Dr., #165, San Diego, CA (US) 92130

( * ) Notice: Subject to any disclaimer, the term of this patent is extended or adjusted under 35 U.S.C. 154(b) by 783 days.

(21) Appl. No.: 11/156,045

(22) Filed: Jun. 17, 2005

(65) Prior Publication Data

US 2005/0281220 A1    Dec. 22, 2005

(51) Int. Cl.
*H04J 3/16* (2006.01)
*H04W 72/00* (2006.01)
(52) U.S. Cl. .................. 370/328; 370/437; 455/450
(58) Field of Classification Search ............. 455/426.2, 455/524, 525, 526, 515, 453, 450, 452.1, 455/561; 370/350, 324, 503, 328–329, 432, 370/468, 437, 230, 235
See application file for complete search history.

(56) References Cited

U.S. PATENT DOCUMENTS 5,512,936 A * 4/1996 Burton et al. ............... 725/120

| 5,999,818 | A | 12/1999 | Gilbert et al. | |
| 6,016,311 | A * | 1/2000 | Gilbert et al. | 370/280 |
| 6,038,455 | A | 3/2000 | Gardner et al. | |
| 6,188,903 | B1 | 2/2001 | Gardner et al. | |

(Continued)

FOREIGN PATENT DOCUMENTS

JP    2000134182 A    5/2000

(Continued)

OTHER PUBLICATIONS

International Search Report for PCT Application No. PCT/US05/22088 mailed Aug. 3, 2006.

(Continued)

*Primary Examiner*—George Eng
*Assistant Examiner*—Brandon J Miller
(74) *Attorney, Agent, or Firm*—Schwabe, Williamson & Wyatt, P.C.

(57) ABSTRACT

In a system utilizing double wide communication channels, if a particular CPE requires a sustained rate that is greater than the bandwidth of a single channel, data to and from the CPE may be split across Channels A and B. Also, when the bandwidth requirements of a particular CPE peaks at a data rate greater than the capacity of a single channel, the CPE's data may be split across the two channels. In one embodiment, a single-wide CPE may communicate with the base station without knowing that it is communicating with a base station configured to communicate using a double wide channel.

18 Claims, 13 Drawing Sheets

U.S. PATENT DOCUMENTS

| | | | |
|---|---|---|---|
| 6,201,970 B1 | 3/2001 | Suzuki et al. | |
| 6,243,372 B1* | 6/2001 | Petch et al. | 370/350 |
| 6,259,314 B1 | 7/2001 | Liu et al. | |
| 6,263,195 B1 | 7/2001 | Niu et al. | |
| 6,373,831 B1 | 4/2002 | Secord et al. | |
| 6,434,129 B1 | 8/2002 | Struhsaker et al. | |
| 6,459,687 B1 | 10/2002 | Bourlas et al. | |
| 6,463,302 B1* | 10/2002 | Kang et al. | 455/562.1 |
| 6,549,759 B2 | 4/2003 | Arviv et al. | |
| 6,577,863 B2 | 6/2003 | Bourlas et al. | |
| 6,597,733 B2 | 7/2003 | Pollmann et al. | |
| 6,683,866 B1 | 1/2004 | Stanwood et al. | |
| 6,693,887 B2 | 2/2004 | Stanwood et al. | |
| 6,694,139 B1 | 2/2004 | Sugaya et al. | |
| 6,704,579 B2 | 3/2004 | Woodhead et al. | |
| 6,707,798 B1 | 3/2004 | Klein et al. | |
| 6,730,683 B2 | 5/2004 | Gallagher et al. | |
| 6,731,946 B1 | 5/2004 | Stanwood et al. | |
| 6,771,660 B1 | 8/2004 | Bourlas et al. | |
| 6,781,980 B1 | 8/2004 | Dajer et al. | |
| 6,785,252 B1 | 8/2004 | Zimmerman et al. | |
| 6,804,211 B1 | 10/2004 | Klein et al. | |
| 6,883,133 B1* | 4/2005 | Gupta | 714/786 |
| 6,925,068 B1 | 8/2005 | Stanwood et al. | |
| 6,944,188 B2 | 9/2005 | Sinha et al. | |
| 6,992,986 B2* | 1/2006 | Reza et al. | 370/252 |
| 7,151,744 B2* | 12/2006 | Sarkinen et al. | 370/230 |
| 7,257,098 B2* | 8/2007 | Sato et al. | 370/329 |
| 2001/0038620 A1 | 11/2001 | Stanwood et al. | |
| 2002/0040381 A1* | 4/2002 | Steiger et al. | 709/102 |
| 2002/0058513 A1 | 5/2002 | Klein et al. | |
| 2002/0080816 A1 | 6/2002 | Spinar et al. | |
| 2002/0102948 A1 | 8/2002 | Stanwood et al. | |
| 2002/0110083 A1 | 8/2002 | Stanwood et al. | |
| 2002/0111161 A1 | 8/2002 | Bourlas et al. | |
| 2002/0114354 A1 | 8/2002 | Sinha et al. | |
| 2002/0115421 A1* | 8/2002 | Shahar et al. | 455/403 |
| 2002/0118666 A1 | 8/2002 | Stanwood et al. | |
| 2002/0119783 A1 | 8/2002 | Bourlas et al. | |
| 2002/0119797 A1 | 8/2002 | Woodhead et al. | |
| 2002/0122395 A1 | 9/2002 | Bourlas et al. | |
| 2002/0122411 A1 | 9/2002 | Zimmerman et al. | |
| 2002/0154688 A1 | 10/2002 | Pollmann et al. | |
| 2002/0156883 A1 | 10/2002 | Natarajan et al. | |
| 2003/0021257 A1* | 1/2003 | Sato et al. | 370/347 |
| 2003/0045307 A1 | 3/2003 | Arviv et al. | |
| 2003/0165157 A1 | 9/2003 | Pollmann et al. | |
| 2003/0225906 A1 | 12/2003 | Natarajan et al. | |
| 2004/0017825 A1 | 1/2004 | Stanwood et al. | |
| 2004/0213197 A1 | 10/2004 | Zimmerman et al. | |
| 2005/0036516 A1* | 2/2005 | Cheung et al. | 370/487 |
| 2005/0058098 A1 | 3/2005 | Klein et al. | |
| 2005/0089064 A1 | 4/2005 | Zimmerman et al. | |
| 2005/0111398 A1* | 5/2005 | Wybenga et al. | 370/328 |
| 2005/0111475 A1* | 5/2005 | Borkowski et al. | 370/437 |
| 2006/0268939 A1* | 11/2006 | Dries et al. | 370/498 |

FOREIGN PATENT DOCUMENTS

WO            0124555 A1      4/2001

OTHER PUBLICATIONS

Written Opinion for PCT Application No. PCT/US05/22088 mailed Aug. 03, 2006.
International Preliminary Report on Patentability for PCT Application No. PCT/US05/22088 issued Dec. 20, 2006.
English translation of Office Action for Korean Patent Application 10-2007-7001317 issued Mar. 18, 2009.
Korean Laid-Open Patent Publication No. 2001-106678 and English translation of Abstract published Dec. 7, 2001.
Notice of the Reason for Refusal of Japanese App. No. 2007-516844 mailed Aug. 18, 2009.
Supplementary Search Report for EP App. 05762325.8 mailed Dec. 2, 2009.

* cited by examiner

Downlink Frames for Radio III

Continuous Operation of QoS

Frame by Frame Operations of Control Module 132

Reception of Data from Modems

Operations Performed by CPE in Uplink

SYSTEMS AND METHODS FOR IMPLEMENTING DOUBLE WIDE CHANNELS IN A COMMUNICATION SYSTEM

BACKGROUND

1. Field of the Invention

This invention relates to wireless communication systems, and more particularly to systems and methods for implementing double wide channels in a communication system.

2. Description of the Related Art

As described in U.S. Pat. No. 6,016,311, titled "Adaptive time division duplexing method and apparatus for dynamic bandwidth allocation within a wireless communication system," which is hereby incorporated by reference in its entirety, a wireless communication system facilitates two-way communication between a plurality of subscriber radio stations and a base station, where the base station is configured to communicate with multiple devices and is coupled to a fixed network infrastructure. Exemplary communication systems include mobile cellular telephone systems, personal communication systems ("PCS"), and cordless telephones. One objective of these wireless communication systems is to provide communication channels on demand between the plurality of subscriber units and their respective base stations in order to connect a subscriber unit user with the fixed network infrastructure (usually a wire-line system). In wireless systems having multiple access schemes, a time "frame" is often used as the basic information transmission unit, where each frame is sub-divided into a plurality of time slots, where some time slots may be used for control purposes and some for information transfer. Subscriber units typically communicate with a selected base station using a "duplexing" scheme that allows information to be exchanged in both directions.

Transmissions from the base station to the subscriber unit are commonly referred to as "downlink" transmissions. Transmissions from the subscriber unit to the base station are commonly referred to as "uplink" transmissions. Depending upon the design criteria of a given system, the prior art wireless communication systems have typically used either time division duplexing ("TDD") or frequency division duplexing ("FDD") methods to facilitate the exchange of information between the base station and the subscriber units. Both TDD and FDD systems of duplexing are known in the art.

Recently, wideband or "broadband" wireless communications networks have been proposed for delivery of enhanced broadband services such as voice, data and video. Broadband wireless communication systems typically facilitate two-way communication between a plurality of base stations and a plurality of fixed subscriber stations or Customer Premises Equipment ("CPE"). In one embodiment, multiple CPE's are each coupled to a plurality of end user connections, which may include both residential and business customers, where the end user connections of the system may have different and varying usage and bandwidth requirements. Each base station may service several hundred or more residential and business CPE's, and each CPE may service several hundred or more end user connections. An exemplary broadband wireless communication system is described in the incorporated U.S. Pat. No. 6,016,311.

Transmission of data between a base station and CPE's is typically at a particular frequency and within a particular frequency bandwidth, or channel. For example, typical channel bandwidths used in point-to-multi-point and point-to-point systems include 7 MHz, 14 MHz, 25 MHz, 28 MHz, 50 MHz, and 56 MHz. In RF communication systems, transceivers used by base stations and CPE's typically comprise a radio transceiver, or simply a "radio," that is configured to transmit and receive communication signals within a particular frequency range. The bandwidth of a channel, coupled with the technology used to implement a wireless link using that channel, determines the user data bandwidth available on the channel. For example, a 25 MHz channel with a 0.25 roll-off factor using 64-QAM modulation (described in further detail below) provides a bit rate of 120 Mbps. Typically, forward error correction ("FEC") is also applied to data signals, thus decreasing the available bandwidth. For example, it would not be uncommon for a FEC to consume 25% of the raw bit rate. In the current example, use of FEC that consumes 25% of the transmitted signal would leave a bit rate of 90 Mbps available for a combination of user traffic, radio link control (RLC), media access control (MAC), and network management. As those of skill in the art will recognize, a rate of 90 Mbps is not sufficient to fully support a single user achieving a peak transfer rate on a 100BaseT Ethernet service. This problem is further evident in situations where a link between a base station and CPE's uses multiple services, such as 100BaseT services, or attempts to provide service to some portion of a Gigabit Ethernet service. Accordingly, there is a need for systems and methods that support transmission of data on wider channels, thus allowing a greater bandwidth of information to be communicated.

Simply designing modems and radios that accommodate larger bandwidth channels is one current approach to this problem. However, this approach can suffer from economies of scale, flexibility, and regulatory requirements. For instance, regulatory requirements often restrict the width of communication channels. Additionally, some systems require smaller channels to maintain compliance or interoperability with certain standards. For example, ETSI BRAN HiperAccess mandates 28 MHz channels for compliance. Building one device (e.g. 28 MHz channels) for one market and another device (e.g., 56 MHz channels) for another market can reduce the ability to take advantage of economies of scale, such as better parts pricing, that may be obtained if the combined total of the devices were identical. For example, in a given geographic location, only a fraction of the CPE's may need, or support, a bandwidth higher than mandated by standards or regulations. According to the prior art, a base station may use two separate systems, one for high bandwidth users and one for low bandwidth users, in order to accommodate the higher bandwidth CPE's.

Because of the above-described deficiencies in the current art, systems and methods for increasing the bandwidth of communication channels while maintaining operability with existing communication systems and standards are desired. Accordingly, a system that provides either two totally independent channels of one bandwidth or a combined channel of double the bandwidth in a single device is desired. Further, it would be advantageous to provide a means to use two regulatory or standards compliant single-bandwidth channels to logically provide user data services with a double bandwidth channel, thus allowing the transport of services which have sustained or peak rates greater that can be accommodated on one single bandwidth channel. In the following description, the term "single-wide" is used in reference to base stations and CPE's that communicate using a communication channel having a predetermined bandwidth, such as a bandwidth that is equal to or less than the relevant standards and regulations, for example. The term "double-wide," as used herein with reference to base stations and CPE's, indicates that the referenced base stations or CPE's communicate using a communication channel having a bandwidth that is double the "single-wide" bandwidth used for the particular base stations and CPE's. Accordingly, a system that supports single-wide CPE's, as well as double-wide CPE's, is desired. In particular, a system that communicates properly with existing single-wide CPE's without requiring any modifications to the single-wide CPE's, while providing the ability to communicate with double-wide CPE's, is desired.

SUMMARY OF THE INVENTION

The present invention is a novel method and apparatus for transmitting data in a wireless communication system. In one embodiment, a method of transmitting data from a base station to a plurality of CPE's comprises receiving data to be transmitted to respective CPE's, determining a bandwidth configuration of said plurality of CPE's, wherein a first CPE is determined to be a single wide CPE and a second CPE is determined to be a double wide CPE, transmitting data on a first channel of a predetermined bandwidth to said first CPE, and transmitting data on the first channel to said second CPE and simultaneously transmitting data on a second channel of the predetermined bandwidth to said second CPE.

In another embodiment, a method for receiving data from a base station by a double wide CPE, wherein the double wide CPE is configured to simultaneously transmit a first channel of a predetermined bandwidth and a second channel of the predetermined bandwidth comprises receiving data on the first channel and simultaneously receiving data on the second channel.

In another embodiment, a method for prioritizing data for transmission on a first and second channel in a communication system comprises categorizing each of a plurality of CPE's as either a single wide CPE or a double wide CPE, buffering data for transmission by a base station to the plurality of CPE's, wherein the base station is configured to transmit two single wide channels, channel A and channel B, and the data is buffered according to the categorizing (a) in a channel A buffer to be transmitted on channel A, (b) in a channel B buffer to be transmitted on channel B, or (c) in a channel C buffer to be transmitted on both channels A and B, generating a channel A data frame for transmission on channel A by pulling data from the buffers A and C until the channel A data frame is full, and generating a channel B data frame for transmission on channel B by pulling data from the buffers B and C until the channel B data frame is full.

In another embodiment, a method of transmitting data from a CPE having a transmitter configured to transmit data to a base station simultaneously on two data channels, wherein each of the two data channels has a predetermined bandwidth is disclosed. In one embodiment, this method comprises receiving data from one or more end user connections for transmission to the base station, wherein the data is subdivided into data blocks 1 to N, wherein block N is the last block of the data, buffering blocks 1 to M of said data for transmission on the first data channel, wherein M is less than N, buffering blocks M+1 to N of said blocks for transmission on the second data channel, and transmitting the 1 to M blocks of data on the first data channel. The method may further comprise transmitting the M+1 to N blocks of data on the second data channel, wherein the respective data blocks are transmitted simultaneously on the first and second channels.

In another embodiment, a method of receiving data from a plurality of CPE's at a double wide base station comprises receiving a first data frame on a first channel having a predetermined bandwidth, wherein the first data frame comprises data from a first single wide CPE and from a double wide CPE and receiving a second data frame on a second channel having a predetermined bandwidth, wherein the second data frame comprises data from a second single wide CPE and from the double wide CPE, the first and second data frame are received at the double wide base station simultaneously.

In another embodiment, a method of receiving data from a double wide CPE at a double wide base station comprises receiving a first data frame on a first channel having a predetermined bandwidth, wherein the first data frame comprises data from a double wide CPE, and receiving a second data frame on a second channel having a predetermined bandwidth, wherein the second data frame comprises data from the double wide CPE, the first and second data frame are received at the double wide base station simultaneously.

In another embodiment, a base station for communicating with a plurality of CPE's comprises a first modem configured to modulate first data for transmission on a first communication channel, a second modem configured to modulate second data for transmission on a second communication channel, an intermediate frequency module coupled to the first and second modem and configured to convert the first and second data to an intermediate frequency thereby generating a first and second transmit data, and a radio configured to transmit the first transmit data on a first transmission channel and transmit the second transmit data on a second transmission channel.

In another embodiment, a base station for communicating with a plurality of CPE's comprises a first modem configured to modulate first data for transmission on a first communication channel, a second modem configured to modulate second data for transmission on a second communication channel, an intermediate frequency module coupled to the first and second modem and configured to convert the first and second data to an intermediate frequency thereby generating a first and second transmit data, and one or more radios configured to simultaneously transmit the first transmit data on a first transmission channel and transmit the second transmit data on a second transmission channel.

In another embodiment, a customer premises equipment (CPE) for transmitting data to a base station comprises a first buffer configured to buffering data for transmission on a first channel, wherein a bandwidth of the first channel is less than or equal to a predetermined bandwidth, a second buffer configured to buffering data for transmission on a second channel, wherein a bandwidth of the second channel is less than or equal to the predetermined bandwidth, and a radio configured to simultaneously transmit data on the first channel and the second channel.

In another embodiment, a system for transmitting data in a communication system at a bitrate that is greater than possible using a single channel having a bandwidth established by a standards comprises a base station configured to transmit data on a first channel having a bandwidth that is less than or equal to the standards and is further configured to transmit data on a second channel having a bandwidth that is less than or equal to the standards, and a CPE configured to receive data on said first channel and said second channel, wherein the CPE is further configured to merge at least portions of the data received on the first channel and the second channel to form a received data signal.

DETAILED DESCRIPTION OF THE PREFERRED EMBODIMENT

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The term "module," as used herein, means, but is not limited to, a software or hardware component, such as a FPGA or ASIC, which performs certain tasks. A module may be software configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

Figure 1:
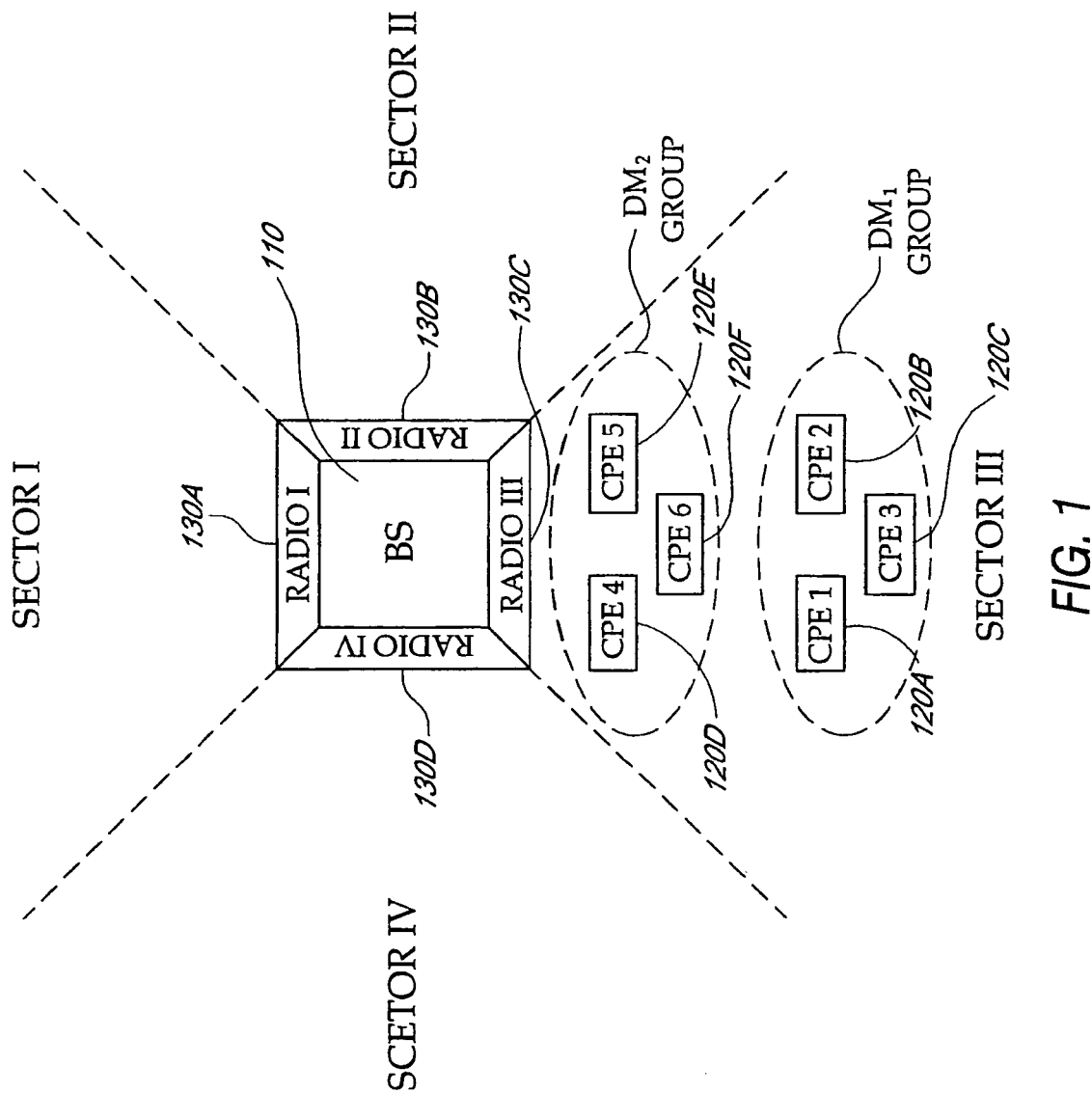
FIG. 1 is a simplified block diagram of a broadband wireless communication system.

FIG. 1 is a block diagram illustrating an exemplary configuration of a base station 110 and multiple CPE's, each identified by reference number 120. The exemplary base station 110 includes four transceivers 130A, 130B, 130C, and 130D, such as radio transceivers, that communicate with devices, such as CPE's 120 in respective sectors I-IV. For explanatory purposes, FIG. 1 illustrates CPE's only in Sector III. However, the four transceiver configuration of the base station 110 allows the base station to communicate with CPE's 120 in any of the four illustrated sectors I-IV. Thus, any number of CPE's 120 may be located in any of the sectors I-IV so that the transceiver 130A is configured to communicate with CPE's in Sector I, the transceiver 130B is configured to communicate with CPE's in Sector II, the transceiver 130C is configured to communicate with CPE's in Sector III, and the transceiver 130D is configured to communicate with CPE's in Sector IV. The exemplary configuration of FIG. 1 includes four sectors, with each sector covering about one quarter of the coverage area of the base station 110. In other embodiments, fewer or more sectors may be serviced by fewer or more transceivers 130.

In the embodiment of FIG. 1, six CPE's 120 are illustrated in Sector IV. More particular, CPE 120A, 120B, 120C, 120D, and 120E are each in Sector III and are configured to communicate with the base station 110 via transceiver 130C. As those of skill in the art will recognize, the base station 110 and various CPE's 120 may be configured to communicate using several different physical layer (PHY) options. In many systems, the PHY is chosen to provide sufficient margin to handle the worst-case environmental conditions under which operation is required, so that typically the system operates at a much more robust and slower data rate than required for all but a few minutes a year. The choice of PHY is linked closely to the data rate and, hence the capacity of the system. More robust PHYs provide slower data rates and lower total capacity. If a more robust PHY is chosen to provide operation under the most challenging environmental conditions, the data rate of the system is lowered even during less challenging environmental conditions. In addition, the PHY mode may be modified from frame to frame or remain constant for a plurality of frames in a particular communication link.

In the examples described herein, data frames include multiple subframe having different downlink PHY modes. The downlink PHY modes that are generally represented herein by the notations $DM_1$, $DM_2$, $DM_3$, and $DM_4$. The data transmitted using each downlink PHY mode is intended for one or more CPE's 120. The receiving CPE 120 will retrieve data that was transmitted using its preferred PHY mode and/or a more robust PHY mode. Many CPE's 120 may be assigned to any one downlink PHY mode where each CPE 120 retrieves its data during the same time block based on an address or identifier. Consequently, in one embodiment, a CPE 120 retrieves data from a portion of a data frame for a particular PHY mode (discussed further below).

The data frames received by the base station 110 from CPE's 120, uplink data, may similarly be divided into subframes. In the examples described herein, the uplink subframes are associated with PHY modes that are generally represented herein by the notations $UM_1$, $UM_2$, $UM_3$, and $UM_4$. Of course, more or fewer uplink and downlink PHY modes can be used in various embodiments. In one embodiment, uplink time blocks are assigned to CPE's 120 for transmission of data to the base station 110. Accordingly, Multiple CPE's 120 may be assigned to a single time block based on the preferred PHY mode of each CPE. For example, CPE's 120A, 120B, and 120C could be assigned to $UM_2$ and CPE's 120D, 120E, and 120F could be assigned to $UM_1$. In this example, the length of the $UM_1$ portion of the uplink data frame will account for the bandwidth requirements of all three CPE's 120A, 120B and 120C and the length of the $UM_2$ portion of the uplink data frame will account for the bandwidth requirements of CPE's 120D and 120E. As with the downlink PHY modes, an individual CPE 120 may be assigned more than one uplink PHY mode.

In the various embodiments described hereafter, the detailed description refers to data being sent and received using three different PHY modes, each using a different modulation type, namely, QAM-4 (also referred to as QPSK), QAM-16, and QAM-64, where QAM-4 is the most robust modulation, but also has a slower data rate than QAM-16 or QAM-64 modulated data. For example, in one embodiment, $DM_1$ and $UM_1$ are QAM-4; $DM_2$ and $UM_2$ are QAM-16; and $DM_3$ and $UM_3$ are QAM-64. In alternative embodiments, any other modulation type, FEC type, or combinations of a modulation and FEC type may be used for the various downlink and uplink PHY modes. For example, a RS encoding system may use different variations of block sizes or code shortening, a convolutional encoding system may vary the code rate, and a turbo code system may use any block size, code rate, or code shortening.

In one embodiment, the CPE's 120 having the same PHY mode (for example, communicating using the same modulation) will often be grouped together for downlink transmissions. More particularly, various data packets associated with one CPE 120 may be mixed with data packets of other CPE's 120 depending on the exact queuing mechanism which prepared the data for transmission. In this case, while a CPE 120 is receiving a downlink transmission the CPE 120 may be required to demodulate all symbols in the time block which uses its assigned modulation. A higher layer addressing mechanism, such as headers, associates the terminal with the data belonging to it.

Communication systems typically include a media access controller ("MAC") which allocates available bandwidth on one or more physical channels on the uplink and the downlink. Within the uplink and downlink sub-frames, the base station MAC allocates the available bandwidth between the various services, requesting bandwidth from their respective CPE's, depending upon the priorities and rules imposed by their quality of service ("QoS").

In one embodiment, the MAC transports data between higher layers, such as TCP/IP, and a physical layer, such as a physical channel. Because the MAC is typically software that executes on a processor in the base station 110, some base stations 110 now include a MAC coprocessor coupled to the MAC. In one embodiment, the MAC coprocessor takes a portion of the work load from the MAC by performing many of the tasks typically performed by MAC's. These tasks may include, for example, during a downlink, sorting data according to priority, storing a data frame of highest priority data, sorting the data frame according to modulation type, forward error correction ("FEC") type, end user connection ID, or other criteria. During an uplink, the MAC coprocessor may receive all data and route the data either to the MAC or a network backhaul. In both the downlink and uplink processes, having a MAC coprocessor working in conjunction with the MAC may significantly increase the communication system's throughput. U.S. Pat. No. 6,459,687 to Bourlas, et al., titled "Method and apparatus for implementing a MAC coprocessor in a communication system," which is hereby incorporated by reference for all purposes, provides a further description of the use of a MAC coprocessor in a communication system.

In one embodiment, the downlink (e.g., from the base station 110 to the plurality of CPE's 120) of the communication system shown in FIG. 1 operates on a point-to-multipoint basis. As described in the related U.S. Pat. No. 6,016,311, the central base station 110 includes a sectored active antenna array which is capable of simultaneously transmitting to several sectors. In the exemplary embodiment of FIG. 1, the active antenna array includes four transceivers (or radios) 130A, 130B, 130C, and 130D. These four transceivers are configured to simultaneously transmit to respective sectors serviced by the base station 110. Within a given frequency channel sector, all CPE's 120 receive substantially the same transmission.

In one embodiment, the CPE's 120 share the uplink on a demand basis that can be controlled by the base station 110. Depending upon the class of services utilized by a particular CPE 120, the base station 110 may issue a selected CPE 120 continuing rights to transmit on the uplink, or the right to transmit may be granted after receipt of a request from a CPE 120. In addition to individually addressed messages, the base station 110 may also send messages to multicast groups, as well as broadcast messages to all CPE's 120.

In one embodiment, the base station 110 maintains sub-frame maps of the bandwidth allocated to the uplink and the downlink. As described in more detail in U.S. Pat. No. 6,016, 311, the uplink and downlink are preferably multiplexed in a time-division duplex (or "TDD") manner. Although the present invention is described with reference to its application in a TDD system, the invention is not so limited. Those skilled in the communications art will recognize that the present inventive method and apparatus can readily be adapted for use in a FDD system.

In one embodiment adapted for use in a TDD system, a frame is defined as comprising N consecutive time periods or time slots (in one embodiment, N remains constant, while in another embodiment N varies over time. In accordance with this "frame-based" approach, the first $N_1$ time slots are dynamically configured (where N is greater than or equal to $N_1$) for downlink transmissions only. The remaining $N_2$ time slots are dynamically configured for uplink transmissions only (where $N_2$ equals $N-N_1$). Under this TDD frame-based scheme, the downlink sub-frame is preferably transmitted first and is prefixed with information that is necessary for frame synchronization.

In another embodiment, an Adaptive Time Division Duplex ("ATDD") system may be implemented. In ATDD mode, the percentage of the TDD frame allocated to downlink versus uplink is a system parameter which may change with time. In other words, an ATDD system may vary the ratio of downlink data to uplink data in sequential time frames. In terms of the example above, in an ATDD system, $N_1$ and $N_2$ (where $N_1$ is the downlink sub-frame and $N_2$ is the uplink subframe) may be different for each data frame, while maintaining the relationship $N=N_1+N_2$. A data frame that is split between uplink and downlink could be either a TDD frame, or an ATDD frame. Therefore, the systems and methods described herein with relationship to a TDD frame could be adapted to an ATDD frame, and vice versa.

Figure 2:
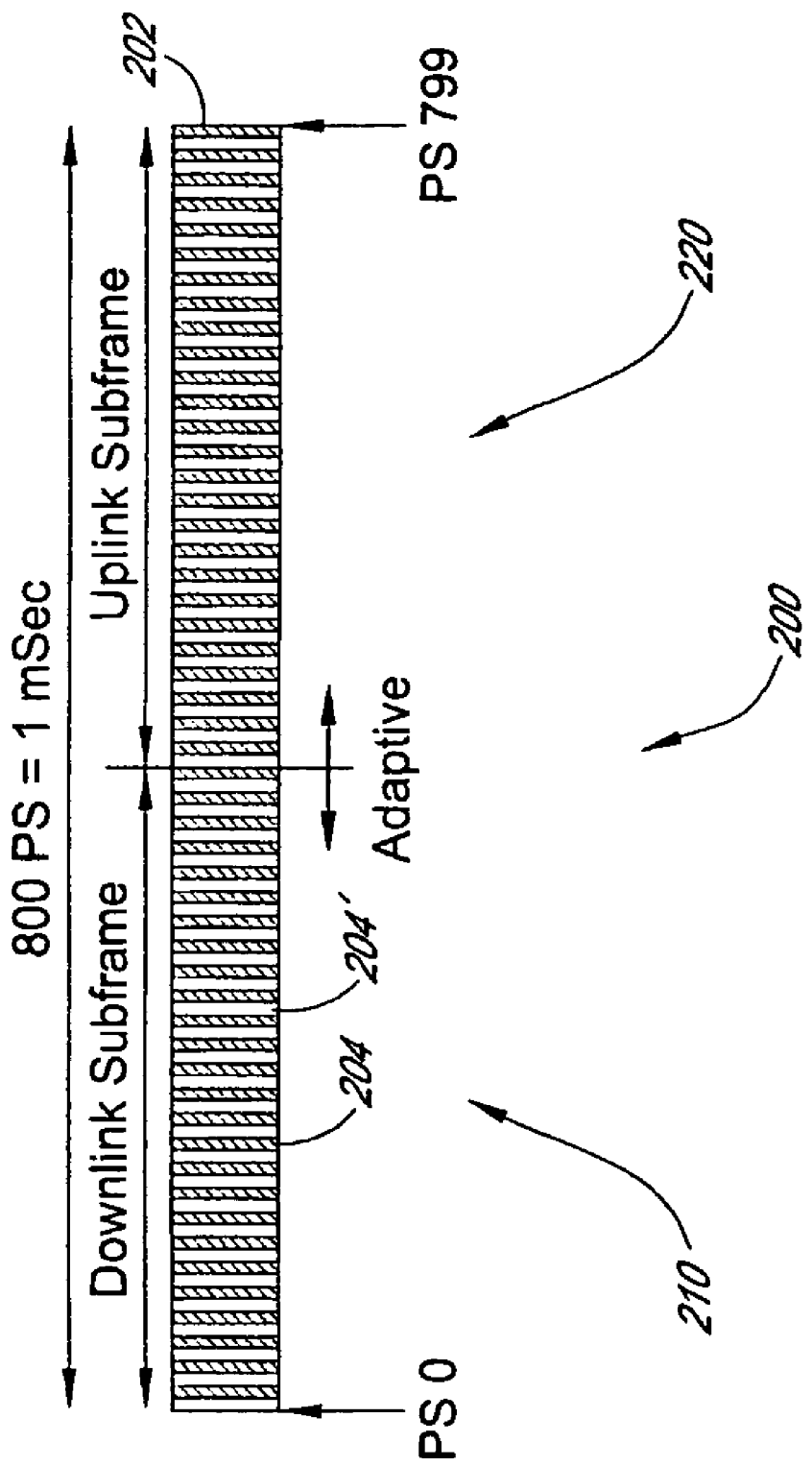
FIG. 2 is a diagram illustrating a TDD or ATDD frame and multi-frame structure that can be used by a communication system, such as the communication system of FIG. 1.

FIG. 2 is a diagram illustrating a TDD or ATDD frame structure 200 that can be used by a communication system (such as the system illustrated in FIG. 1). As shown in FIG. 2, the frame 200 is subdivided into a plurality of physical slots ("PS") such as 204 and 204'. In the embodiment of FIG. 2, the frame 200 is one millisecond in duration and includes 800 physical slots. Alternatively, the present invention can be used with frames having longer or shorter duration and with more or less PS's 204 and 204'.

As noted above, the following detailed description refers to data being sent and received using three different modulation types, namely, QAM-4, QAM-16, and QAM 64. Accordingly, each of the downlink subframe 210 and the uplink subframe 220 may be subdivided into portions for transmission using each of the available modulation types, such as QAM-4, QAM-16, and QAM-64. In alternative embodiments, any other modulation type, FEC type, or variation of a modulation or FEC type may be used. For example, a RS encoding system may use different variations of block sizes or code shortening, a convolutional encoding system may vary the code rate, and a turbo code system may use any block size, code rate, or code shortening.

Figure 3:
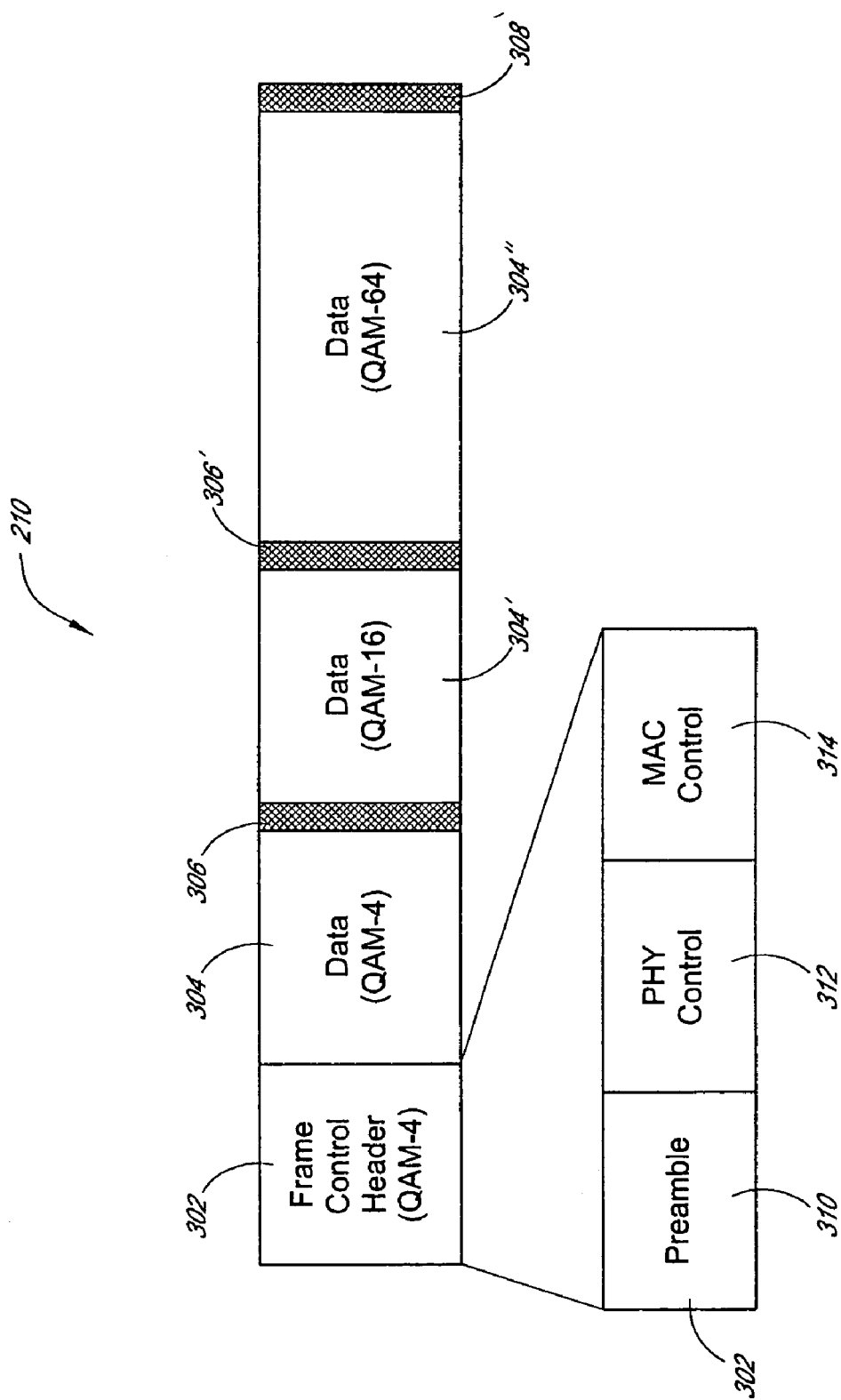
FIG. 3 is a diagram illustrating an exemplary TDD or ATDD downlink sub-frame that can be used by the base station to transmit information to one or more of the CPE's illustrated in FIG. 1.

FIG. 3 is a diagram illustrating an exemplary TDD or ATDD downlink sub-frame 210 that can be used by the base station 110 to transmit information to one or more CPE's. Thus, with respect to the example provided above, during each one millisecond time frame (or other predetermined period), the downlink sub-frame 210 is first transmitted from the base station 110 to the CPE's 120 in one or more sectors. After the downlink sub-frame has been transmitted, the uplink sub-frame 220 (FIG. 2) is received by the base station 110 from particular CPE's 120. In an advantageous embodiment, the downlink sub-frame 210 is dynamic so that each frame may include varying quantities of downlink PS's 204 (FIG. 2), as determined by the MAC, for example.

In an advantageous embodiment, the downlink sub-frame 210 comprises a frame control header 302, a plurality of downlink data PS's grouped by PHY (for example, any combination of modulation type, FEC type, CPE index, and connection ID). In the embodiment of FIG. 3, the PS's of the downlink subframe 210 are divided according to modulation type, namely QAM-4 modulated PS's 304, QAM-16 modulated PS's 304' and QAM-64 modulated PS's 304". These groupings by modulation type may be separated by modulation transition gaps ("MTGs") 306, such as shown in FIG. 3. A MTG may also be used after a downlink sub-frame 210 to separate the downlink sub-frame 210 and the subsequent uplink sub-frame. In various embodiments of the downlink sub-frame, any one or more of the differently modulated data blocks may be absent. In one embodiment, MTGs 306 are 0 ("zero") PS's in duration.

In the embodiment of FIG. 3, the frame control header 302 contains a preamble 310 that is used by the physical protocol layer for synchronization and equalization purposes. The frame control header 302 also includes control sections for both the PHY (312) and the MAC (314). A FDD downlink subframe may be substantially identical to the structure of FIG. 3, but without a Tx/Rx transition gap 308. The PHY Control portion 312 of the frame control header 302 may advantageously contain a broadcast message indicating the identity of the PS at which the modulation scheme changes.

Figure 4:
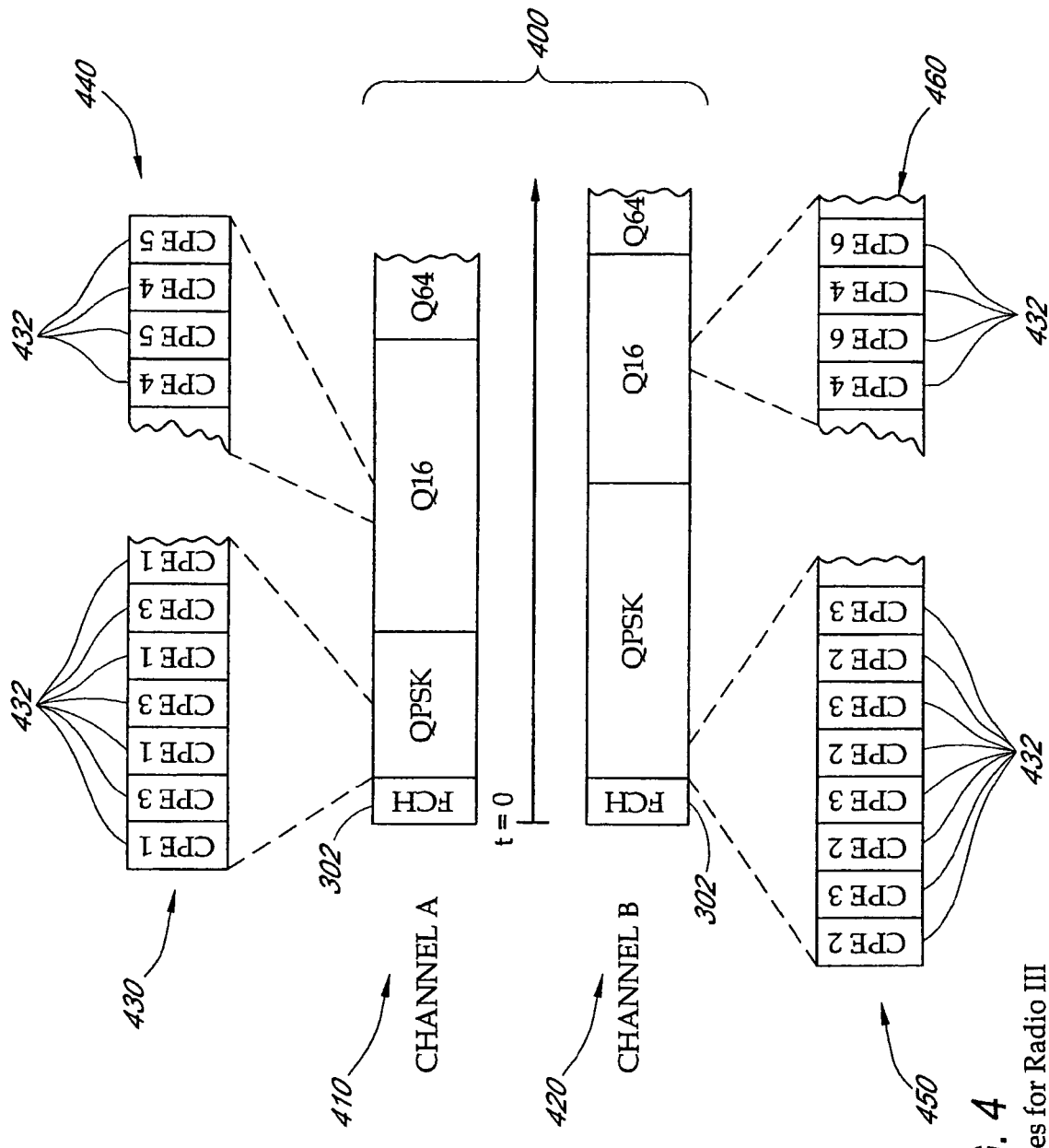
FIG. 4 is a block diagram illustrating a frame structure for portions of communications signals transmitted in a double wide channel.

FIG. 4 is a block diagram illustrating the frame structure of portions of communications signals transmitted in a double wide channel 400. More particularly, FIG. 4 illustrates a portion of the frame structure 410 for transmission on a first channel (hereinafter referred as "Channel A"), and a frame structure 420 for transmission on a second channel (hereinafter referred "Channel B"), where Channels A and B are advantageously transmitted from the base station 110 and together form a double wide channel. As will be explained in further detail below, both Channel A and Channel B may be received by a CPE 120, thus allowing the CPE 120 to receive up to twice the bandwidth as a CPE 120 receiving only a single channel. Similarly, CPE's 120 may be configured to transmit double wide channels to the base station 110 so that communication between the base station 110 and a CPE 120 configured for transmitting and receiving double wide channel (hereinafter referred to as a "double wide CPE") uses double wide channels bi-directionally.

With reference to FIG. 4, blocks 430 and 440 illustrate details of portions of the exemplary frame structure 410 that are to be transmitted on Channel A. More particularly, block 430 illustrates the arrangement of data in the QPSK portion of the frame 410 and block 440 illustrates the arrangement of data in the QAM-16 portion of the frame 410. In each of the blocks 430 and 440, only the arrangement of data, according to the sequence, is illustrated. Specifically, each of the CPE data blocks 432 indicate a particular CPE for which the data in that particular CPE data block 432 is intended. The data included in each of the CPE data blocks 432 may be in any format and may include any type of data.

Similar to blocks 430 and 440, blocks 450 and 460 illustrate details of portions of the exemplary frame structure 420 that are to be transmitted on Channel B. More particularly, block 450 illustrates the arrangement of data in the QPSK portion of the frame 420 and block 460 illustrates the arrangement of data in the QAM-16 portion of the frame 420. The particular CPE's 120 listed in blocks 430, 440, 450, and 460 of FIG. 4 correspond with the CPE's 120 illustrated in FIG. 1. Accordingly, the frames 410 and 420 are intended for transmission by the radio 130C to the CPE's 120 in Sector III.

Table 1, below, lists each of the CPE's 120 in sector m of FIG. 1 and indicated whether each CPE 120 is a double wide CPE or, alternatively, if a CPE 120 is only capable of transmitting and receiving on a single communication channel.

| CPE | Channel A | Channel B |
|-----|-----------|-----------|
| 1   | Yes       | No        |
| 2   | No        | Yes       |
| 3   | Yes       | Yes       |
| 4   | Yes       | Yes       |
| 5   | Yes       | No        |
| 6   | No        | Yes       |

As shown in Table 1, CPEs 1 and 5 (120A and 120E) are configured to communicate with the base station 110 using Channel A, but not channel B; CPEs 2 and 6 (120B and 120F) are configured to communicate with the base station 110 using Channel B, but not Channel A; and CPE's 3 and 4 (120C and 120D) are each configured to communicate with the base station 110 using a double wide channel comprising Channels A and B. Accordingly, as illustrated in FIG. 4, Channel A includes data for transmission to CPE's 1 and 3-5 (120A, 120C, 120D, and 120E) and Channel B includes data for transmission to CPE's 2-4 and 6 (120B, 120C, 120D and 120F).

In a system utilizing double wide communication channels, if a particular CPE 120 requires a sustained rate that is greater than the bandwidth of a single channel, data to and from the CPE 120 may be split across Channels A and B in some fashion (described further with respect to FIGS. 8-10, below). Also, when the bandwidth requirements of a particular CPE 120 peaks at a data rate greater than the capacity of a single channel, the CPE's data may be split across the two channels. Finally, the above described situations where data may need to be split among channels may further cause data from other CPE's to be split across channels merely for the convenience of the bandwidth allocation algorithm.

In an advantageous embodiment, a single-wide CPE may communicate with the base station 110 without knowing that it is communicating with a base station 110 configured to communicate using a double wide channel. In this embodiment, the single-wide CPE may not even be aware that it is communicating with only one sub-channel of a base station 110 transmitting a double wide channel comprising two sub-channels. Accordingly, the systems and methods described herein provide for the uninterrupted communication between existing single-wide CPE's and a double-wide base station, while also allowing double-wide CPE's with additional bandwidth to communicate with the double-wide base station.

When double wide CPE's 120 are communicating on a double wide channel with the base station 110, the proper order in which to compile data received on the two channels should be determined. For example, with reference to FIGS. 1 and 4, CPE 3 receives data in the QPSK portions of both Channel A and Channel B. The data received by CPE 3 in both channels is typically assembled by the CPE 3 in order to generate the data, as transmitted by the base station 110. Since channels A and B are transmitted simultaneously to all of the CPE's 120 in Sector III, including CPE 3, pieces of data from a single CPE 120 may be transmitted simultaneously, one on channel A and one on channel B. Accordingly, when the base station 110 transmits data to a particular CPE 120 using both channels, the base station 110 and CPE 120 must implement the same algorithm for ordering the data from an individual service or connection.

In one embodiment, within each frame 200 (FIG. 2), data on channel A will be logically earlier than data on channel B. Since the frame duration is short, this adds minimal delay while adding no overhead in determining the order of CPE data blocks 432 for a particular CPE 120. In this embodiment, the base station 110 builds the downlink for channel A first and, when it has filled it, the downlink for channel B is built. This advantageously provides a simple method for keeping the logical time order of the data correct. After the downlink for both channels are filled with data (built), the base station transmits both frames simultaneously on their respective channels. Similarly, in this embodiment the CPE 110 receives downlink data on two channels simultaneously. The data on channel A may be transferred directly to its destination or any subsequent processing module (e.g., AAL-5 SAR function), while data on channel B is buffered until the entire frame is processed for channel A. After the data from channel A is transferred to its destination, the buffered data from channel B may then be transferred to the destination.

Figure 5A:
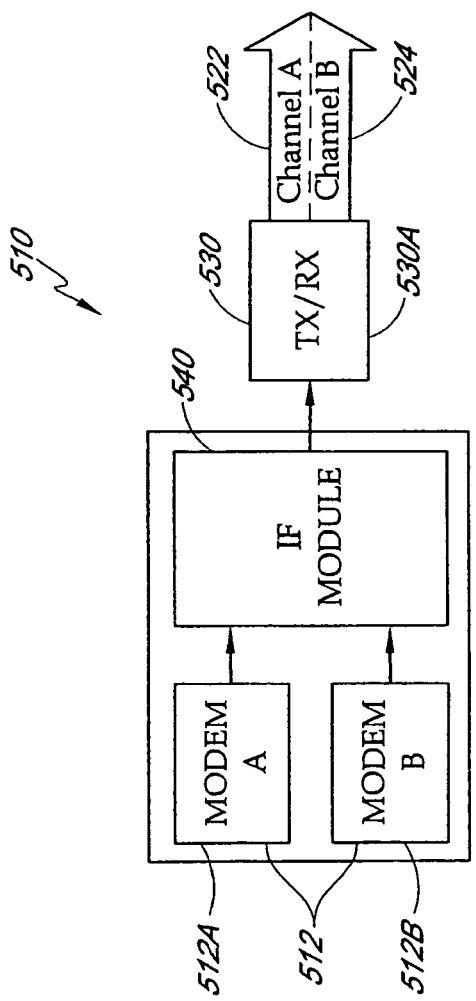
FIGS. 5A and 5B are block diagrams of exemplary configurations of base stations, each configured to transmit a double wide communication signal.
Figure 5B:
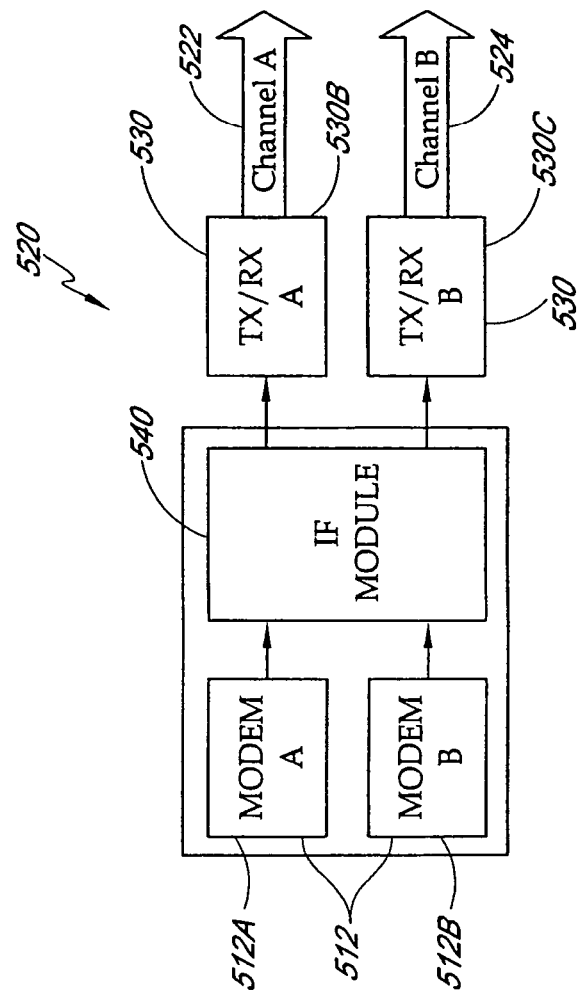

In another embodiment, a sequence number is included with each CPE data block 432, where the sequence numbers indicate a location in the original data block for each CPE data block 432. Accordingly, this sequence number allows proper ordering of the received data. The use of sequence numbers as described may be particularly useful in systems that already use a sequence number for such purposes as Automatic Resend reQuest (ARQ). For example, use of ARQ provides for retransmission of data that is corrupted. Since corruption can happen in the middle of a burst with both ends being good, the retransmission can cause data to be out of order. Additionally, there needs to be some way of indicating what should be retransmitted. To solve both of these issues, some prior art systems have a packet number or block number inserted at a known place in the each packet. This allows identification of chunks of data for reordering and to determine when something is missing. Thus, in one embodiment, the same ARQ sequence number could be used both to ensure order and to detect missing data that must be retransmitted FIGS. 5A and 5B are block diagrams illustrating exemplary communication modules configured to transmit a double wide communication signal that may be included in a base stations 510 and 520. Each of the base stations 510 and 520 include a first modem 512A and a second modem 512B. The first modem 512A is configured to receive data for transmission on a Channel A 522 and the second modem 512B is configured to receive data for transmission on a Channel B 524.

Each of the base stations 510 and 520 also includes an IF Module 540. In general, the IF Module 540 is configured to upconvert the data signals received from modems 512A and 512B for transmission by the transceiver 530. In one embodiment, the IF Module 540 is located in an outdoor unit (ODU) portion of the base station. In the embodiment of FIGS. 5A and 5B, the IF Module 540 receives inputs from two modems 512A and 512B. However, a separate IF Module 540 could be used to receive inputs from each of modem 512A and modem 512B. With either approach, the signal paths of Channel A and Channel B are separate through the up-conversion. Combining the IF modules for each of the channels on a single board may provide some efficiency. For example, by implementing two IF modules on a single board, the cost of manufacturing the IF modules may be reduced and the space required in a housing, such as in an ODU, may also be reduced.

In one embodiment, the output from each of the modems 512A and 512B is a 140 MHz modulated signal. These modulated signals are then received by the IF Module 540 which up-converts the frequency of the signals and provides the up-converted signals for transmission by the transceiver 540. In one embodiment, the 140 MHz modulated signal is converted to an approximately 2.56 GHz (S band) signal. Although the following discussion relates to a system that transmits user data within the millimeter wave band at frequencies of approximately 28 GHz, the system is not so limited. Embodiments of the system are designed to transmit user data at frequencies, for example, of 2 GHz to 66 GHz.

Each of the base stations 510 and 520 are configured to transmit data on both of channels A and B. Base station 510 includes a single transceiver 530A, such as a radio, to transmit a single double wide channel, comprising both channel A and channel B. Accordingly, the transceiver 530A is configured to transmit using a channel that has a bandwidth that is twice as large as the implemented standard. This double wide channel may then be received at a CPE 120 as two single wide channels, thus falling within the implemented standard. For example, if the standard in a particular communication system requires a channel bandwidth of 25 MHz, the double wide channel transmitted by transceiver 530 will be 50 MHz. However, the CPE 120 may see the 50 MHz channel as two 25 MHz channels and, accordingly, be able to accept and use the received data within the established standard. Additionally, in an advantageous embodiment, a single-wide, standards compliant, CPE from any vendor may communicate with the double-wide base station, along with other single-wide and double-wide CPE's, without knowing that the base station is configured to communicate on two single-wide channels (e.g., two sub-channels of a double wide channel).

Base station 520 includes two transceivers 530B and 530C to transmit two independent single wide channels, such as channel A and channel B, where each of the single wide channels is within the relevant standards and/or regulatory requirements. While within the relevant standards, the combination of the channels transmitted by transceivers 530B and 530C form a double wide channel with potentially double the data rate as each of the channels alone. For example, if the standard in a particular communication system requires a channel bandwidth of 25 MHz, channel A 522 and channel B 524 may each be 25 MHz wide (within the standards and regulatory requirements). However, the CPE 120 may receive both of the 25 MHz channels and, accordingly, receive data at up to double the rate possible in a either of the channels alone.

For example, in one embodiment the CPE 120 includes two radios 130, each configured to receive one of the 25 MHz channels. In another embodiment, a single-wide, standards compliant, CPE from any vendor may communicate with the double-wide base station 520, along with other single-wide and double-wide CPE's, without knowing that the base station 520 is configured to communicate on two single-wide channels.

Figure 6:
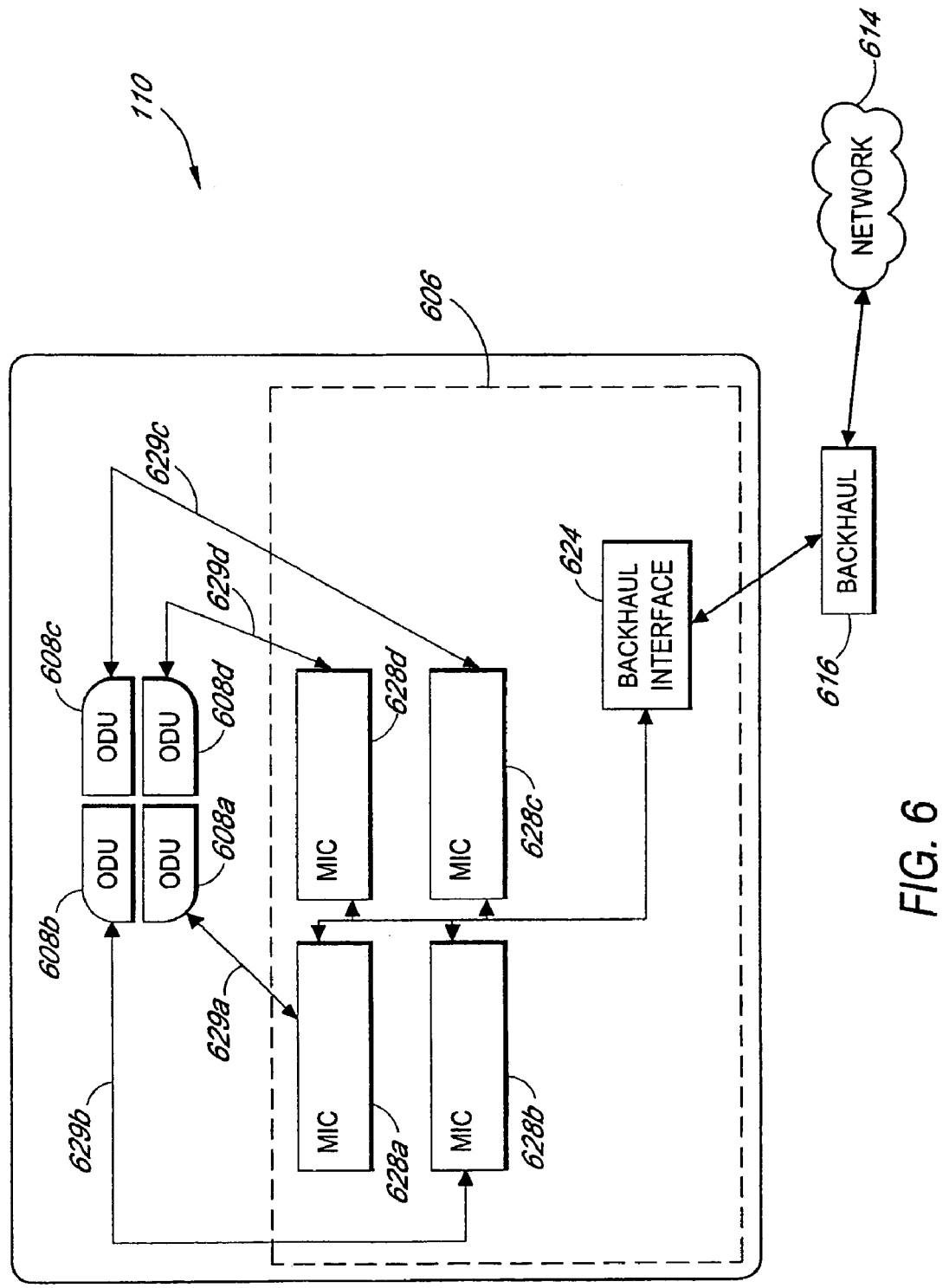
FIG. 6 is a block diagram illustrating many of the components in the exemplary base station of FIG. 1.

FIG. 6 is a block diagram illustrating many of the components in the exemplary base station 110 (FIG. 1). As illustrated in FIG. 6, the base station 110 includes an in door unit ("IDU") 606 and a group of outdoor units 608*a*, 608*b*, 608*c*, and 608*d*. In one embodiment, each ODU 608 in the group of ODUs is oriented to receive and transmit customer data in a particular sector of the coverage area of the base station 110. In one embodiment, multiple ODUs 608 from the group of ODUs are oriented in the same sector.

One embodiment of the base station IDU 606 includes at least one modem interface card (MIC) 628 and a backhaul interface 624. In the embodiment of FIG. 6, each MIC 628*a*, 628*b*, 628*c*, and 628*d* communicates with one ODU 608 over a communication link 629(*a-d*) to form a MIC 628/ODU 608 pair. For example, MIC 628(*a*) communicates with ODU 608(*a*), MIC 628(*b*) communicates with ODU 608(*b*), and MIC 628(*n*) communicates with ODU 108(*n*) to form pairs of MIC/ODUs. Each MIC/ODU pair transmits and receives customer data between the fixed CPE's 120 and the backhaul interface 624. Each of the MIC's 628 provides an interface between the backhaul interface 624 and the ODU 608.

Figure 7:
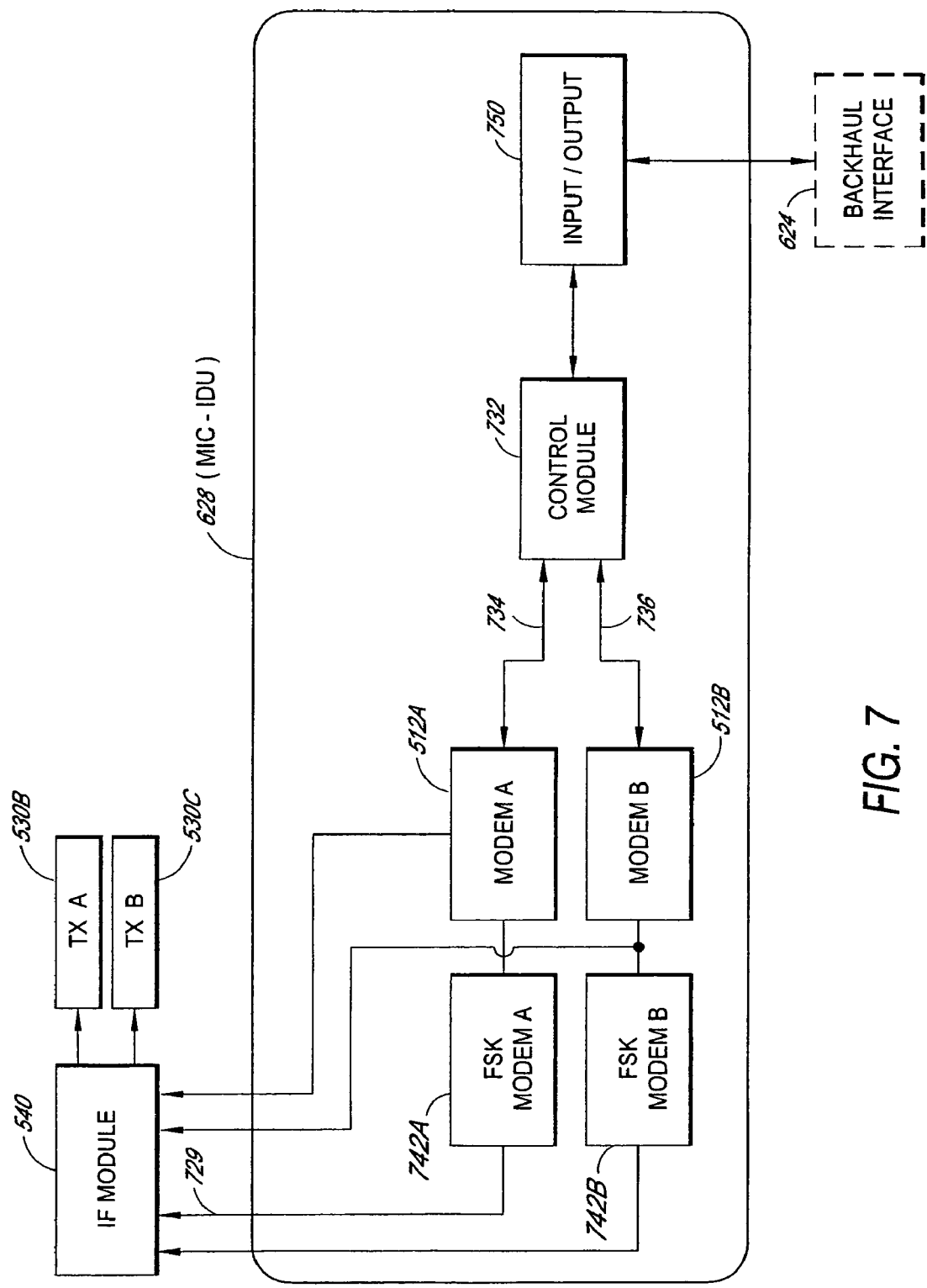
FIG. 7 is a more detailed block diagram of the MIC illustrated in FIG. 6.

FIG. 7 is a more detailed block diagram of modules of the MIC 628 illustrated in FIG. 6. In one embodiment, each MIC 128 includes an input/output module 750, a control module 732, a first modem 512A and second modem 512B for modulating/demodulating customer data, and buses 734 and 736 coupling the control module 732 with the modems 512A and 512B. In one embodiment, one or both of the modems 512A and 512B may include a Field Programmable Gate Array (FPGA) that stores instructions for controlling other subcomponents of the MIC 128. The embodiment of FIG. 7 further comprises Frequency Shift Key (FSK) modems 742A and 742B configured to modulate and demodulate data, such as control messages, from the IF Module 540. For example, one or both of the modems may communicate with respective Frequency Shift Key (FSK) modems 742A and 742B in order to send FSK modulated control messages from the MIC 128 to the IF Module 540. In one embodiment, the components of the MIC 628 are incorporated into a single card, thus allowing the MIC 628 to be rack mounted in an IDU box, which is a standard size box used in the art. One in the art will recognize that these components may alternatively be arranged between multiple boards in multiple locations.

In one embodiment, each MIC 628 is under the control of the control module 732. In the exemplary embodiment of FIG. 7, the control module 732 is in communication with the input/output module 750 that attaches to the backhaul interface 124. The control module 732 receives packet data from the input/output module 750 and transmits the packet data to each of the modems 512A and 512B for modulation/demodulation before being sent to the IF Module 540. In one embodiment, the IF Module 540 is included in the IDU 628 so that it may be directly connected to the circuit board containing the Modems 512A and 512B. In this embodiment, a broadband cable, such as an RG-6 cable, may be used to couple the IF Module with the ODU, including transceivers 530B and 530C. Those of skill in the art will recognize that the components illustrated in FIG. 7 may be arranged in various configurations, grouped in various manners, and located in one or more housings, in conjunction with the systems and methods described herein. In one embodiment, the control module 732 also monitors the quality of the received packet data, such as by determining a service related quality (e.g., packet error rate (PER) or cell loss ratio (CLR)) or a wireless link quality (e.g., bit error rate (BER) or signal to noise ratio (SNR)).

Figure 8:
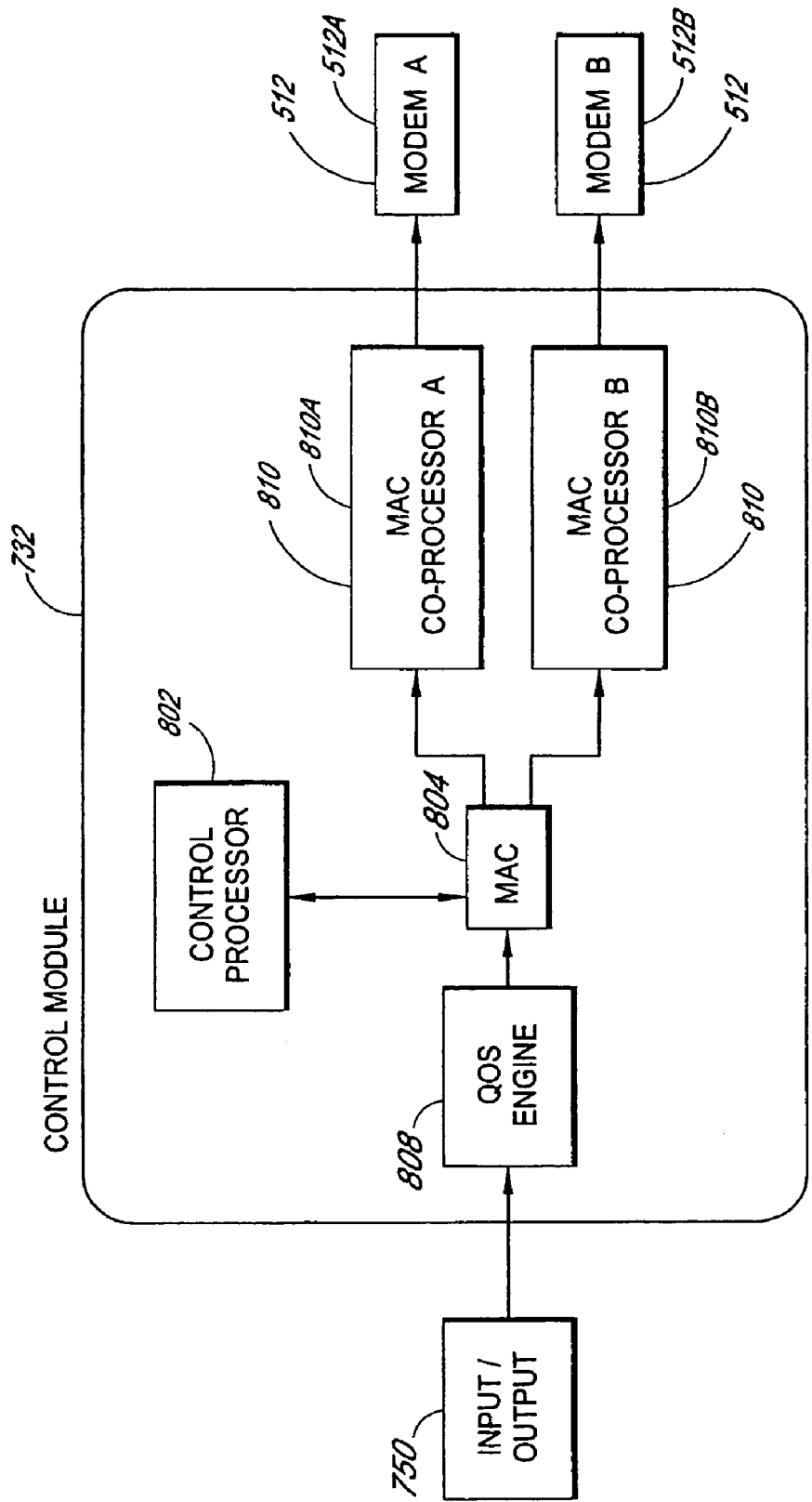
FIG. 8 is a block diagram of an exemplary Control Module in the MIC of FIGS. 6 and 7.

FIG. 8 is a block diagram of modules of an exemplary Control Module 732 in the MIC 128. The control module 732 comprises, in general, a control processor 802 operable to execute a MAC 804A and a MAC 804B software, a Quality of Service module ("QoS") 808 operable to receive and prioritize the CPE 120 data from the input/output module 150, and first and second MAC Co-Processors ("MCP") 810A and 810B each operable to store and sort a data frame for output to modems 512A and 512B, respectively. The operation of each of these components will be discussed in more detail below.

In one embodiment, the hardware MCP's 810A and 810B each include a co-processor that interfaces with a hardware QoS engine 808 and a MAC 410 implemented with software executed by the Control Processor 802. However, while each of these modules is described below to perform specific functions, it is contemplated that the functions of any of these modules may be performed by other of the modules. For example, in one embodiment any of the functions described below with respect to the MCP 810A may be performed by the MAC 804A and, likewise, any of the functions described below with respect to the MAC 804A may be performed by the MCP 810A. In another embodiment, the functionality of the QoS engine 808 is performed by one or both of the MCP's 810A and 810B, thus removing the need for a separate QoS engine 808 and possibly reducing the amount of physical space required to implement such a system.

In one embodiment, data arrives at the QoS engine 808 from the input/output module 750. As stated above, each CPE 120 may be coupled to a plurality of end user connections ("connections"), each of the connections potentially using a different broadband service. As such, each connection has assigned QoS and traffic parameters, which the QoS engine 808 uses to determine which data packets will be sent first. The QoS engine 808 prioritizes arriving data according to the respective QoS and traffic parameters of the connection the data packet is intended for. The QoS engine 808 may use these parameters in conjunction with many techniques that are well known in the art, such as fair-weighted and round-robin queuing in order to determine data priority.

The Channel A MCP 810A receives PHY/MAC control and MAC protocol messages from MAC 804A, pulls data packets from the QoS engine 808, retrieves CPE 120 settings (such as modulation and FEC), stores the data packets in a buffer for Channel A, and sorts the data packets according to the PHY mode of the respective connection. The Channel B MCP 810B operates in the same manner as the Channel A MCP 810A, but retrieves, sorts, and buffers data for Channel B. As described above, some or all of the CPE's 120 are double wide CPE's, while others are configured to received data on only a single channel. Thus, in order to maximize communication efficiency, the MCPs 810A and 810B advantageously determine which of the CPE's 120 are double wide CPE's so that data may be allocated to both channels for transmission to double wide CPE's. A more detailed description of the frame building process is provided below with respect to FIGS. 9 and 10.

In a double wide base station 110, when a predetermined frame period (e.g., one millisecond) has passed, buffered data is transferred to the Channel A modem 512A and Channel B modem 512B.

Figure 9:
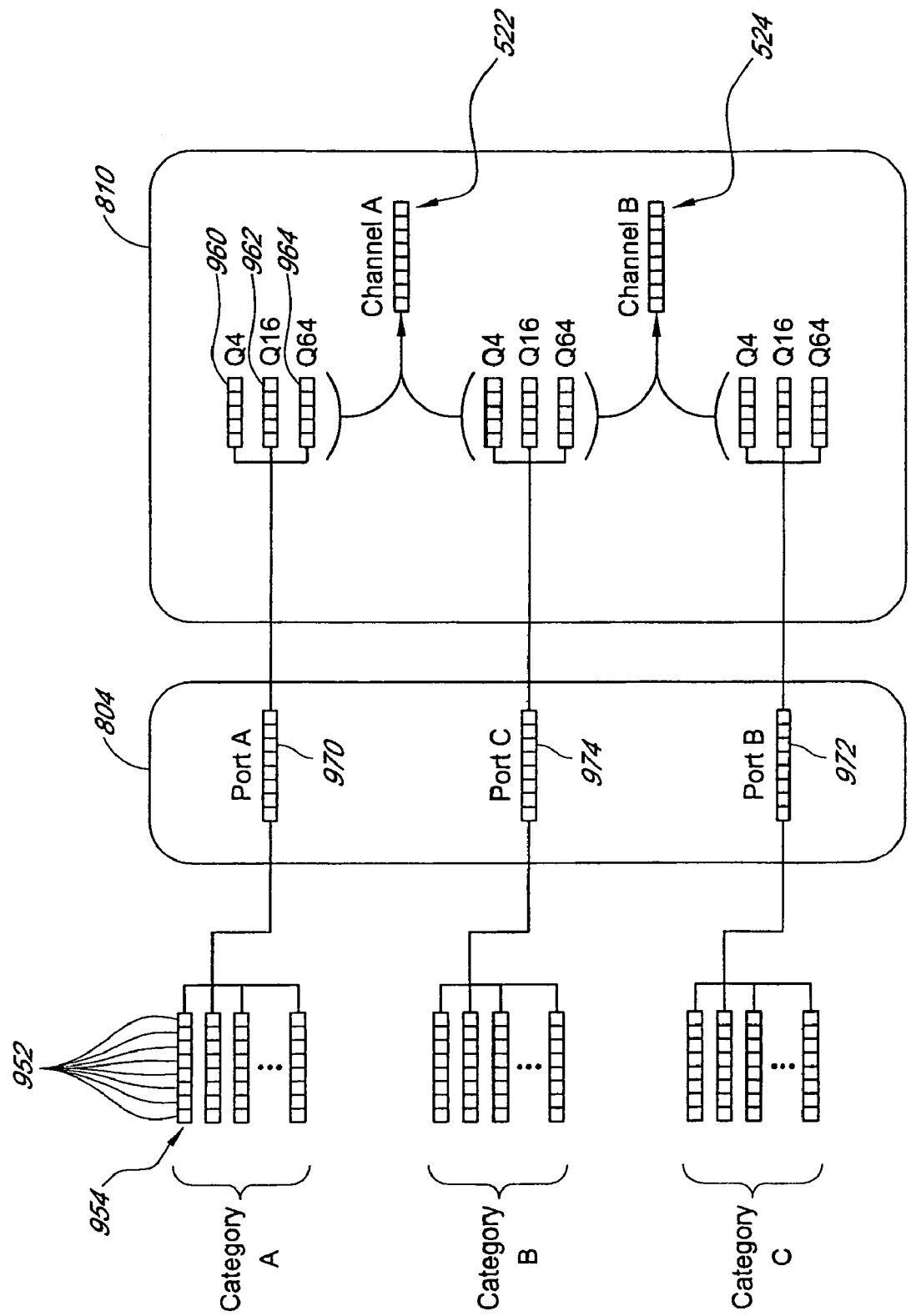
FIG. 9 is a block diagram showing an exemplary arrangement of components used for organizing data for transmission to various single-wide and double-wide CPE's.

FIG. 9 is a block diagram showing an exemplary arrangement of components used for organizing data for transmission to various single-wide and double-wide CPE's. In the example of FIG. 9, the MCP 810 is configured to communicate with 2 modems, such as modems 512A and 512B, used to implement a double-wide communication channel. In other embodiments, however, one MCP 810 may be used fro each modems, such as illustrated in FIG. 8.

In the example of FIG. 9, CPE's are divided into three connection type categories. In particular, connections to single wide CPEs that operate only on sub-channel A are in Category A, connections to single wide CPEs that operate only on sub-channel B are in Category B, and connections to double-wide CPEs that can be split across both sub-channels are in Category C. Reference numeral 954 identifies a block of data cells 952 from a particular CPE in Category A. Each of the remaining rows of data cells (unlabeled, but similar to the row of cells reference by numeral 954) also represent data cells from a particular CPE in one of the above-described connection type categories. In various embodiments, any number of CPE's that are serviced by a particular base station may be in each of the connection type categories. For example, in one embodiment the number of CPE's in categories A and B (single wide CPE's) may be much larger than the number of CPE's in Category C (double wide CPE's).

In the exemplary embodiment of FIG. 9, the MAC 804 includes multiple ports, such as WAN ports, each using a different PHY mode. The data cells from connections in category A are queued for port A 970, connections in category B are queued for port B 972, and connections in category C are queued for port C 974. With data cells queued for the ports A, B, and C, the MCP 810 pulls cells, up to n per frame, in a weighted fair queuing fashion. In one embodiment, the MCP 810 buffers cells in each Category according to modulation, preserving order within a modulation. As shown in FIG. 9, for example, QAM-4 modulated cells in category A are buffered in a Q4 Buffer 960, QAM-16 modulated cells in category A are buffered in a Q16 Buffer 962, and QAM-64 modulated cells in category A are buffered in a Q64 Buffer 964. Data cells in the other Categories are similarly buffered by the MCP 810 according to modulation.

The MCP 810 is configured to pull data cells from the modulation organized buffers for each of the Categories A, B, and C, in order to fill Channel A 522 Channel B 524 for transmission by a transceiver 130. In an advantageous embodiment, if the cells pulled during a given frame, from port A 970 and/or port C 974, fill the downlink subframe for Channel A 522, the MCP 810 stops pulling cells from port A 970, but continues to pull from ports B 972 and C 974. Similarly, if the cells pulled during a given frame, from port B 972 and/or port C 974, fill the downlink subframe for Channel B 524, the MCP 810 stops pulling cells from port B 972, but continues to pull from port A 970 and port C 974. When the combined number of cells from categories A, B, and C equals the combined capacity of both channel's A 522 and B 524, the MCP 810 stops pulling data cells from all ports 970, 972 and 974. With the data Channels buffered, the data may be transmitted to one or more modems, such as modems 512A and 512B in FIG. 7, in preparation for transmission by a transceiver 130.

Figure 10:
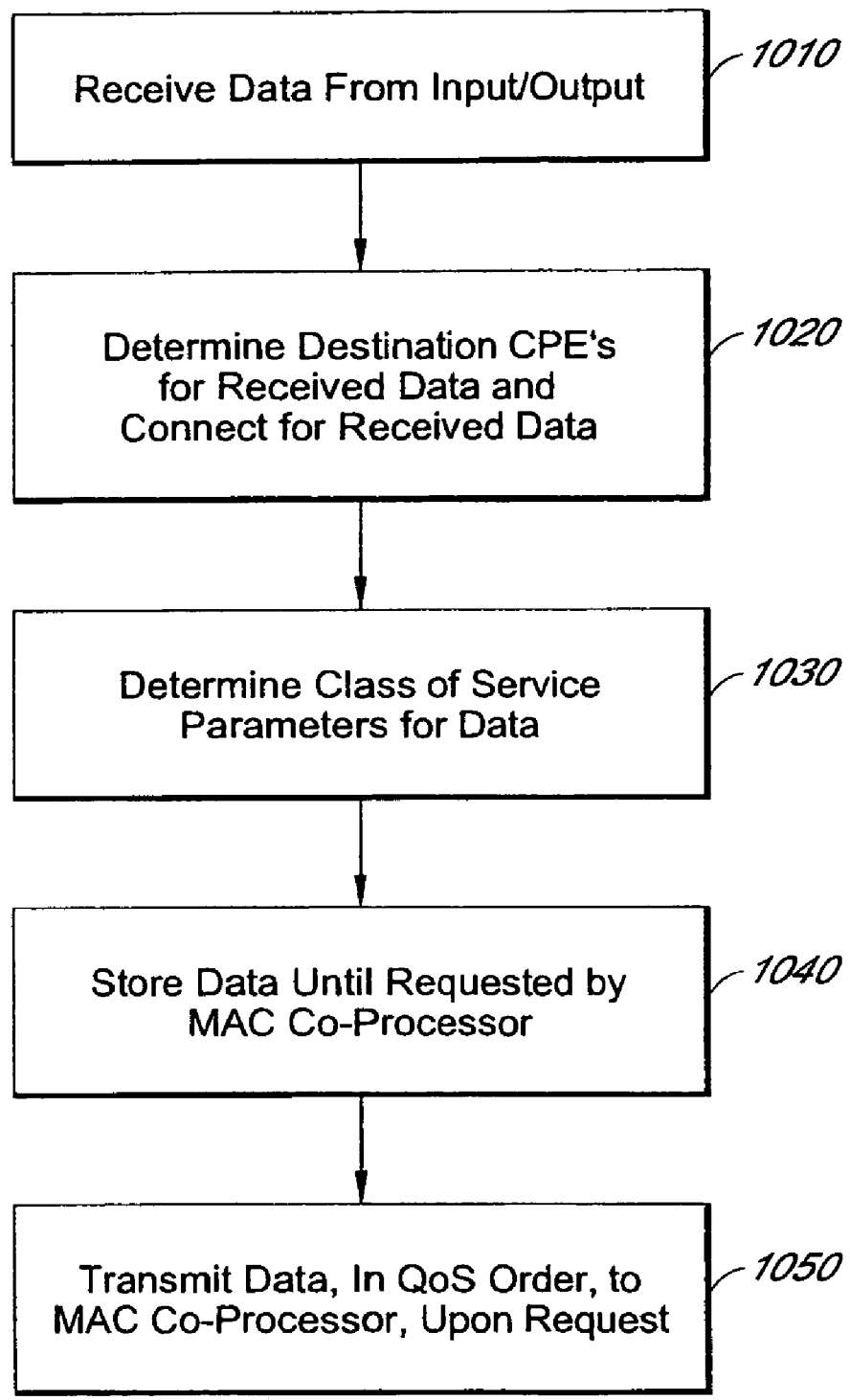
FIG. 10 is a flow chart illustrating the operation of an exemplary QoS.

FIG. 10 is a flow chart illustrating the operation of an exemplary QoS engine 808. As described above, in some embodiments the described operations of the QoS engine 808 may be performed by either a MAC or a MCP. In general, the QoS engine 808 receives data, determines the destination CPE and service parameters for the CPE and the received data, and stores the data for one of the MCP's 810A or 810B.

In step 1010, the QoS engine 808 receives data from the Input/Output (I/O) module 750. The data may be in any available format so long as the destination CPE 120 for each data packet may be determined.

In step 1020, the QoS engine 808 determines the destination CPE 120 and connection for the received data. This may be determined using various information contained in the received data, such as in a header portion of the data.

In step 1030, the QoS engine 808 determines the class of service assigned to each connection in order to prioritize data received for various connections. More particularly, the QoS engine 808 prioritizes data 133 according to the respective QoS parameters of the connection the data packet is intended for. The QoS engine 808 may use these parameters in conjunction with many techniques that are well know in the art, such as fairweighted and round-robin queuing in order to determine data priority.

In step 1040, the QoS engine 808 stores the prioritized data in one or more buffers, where the data will remain until being requested by a MCP 810. In one embodiment, the data is organized in the buffer according to the priorities assigned by the QoS engine 808.

In step 1050, data stored by the QoS engine 808 is requested by a MCP 810. In one embodiment, data is requested by the MCP 810 in the manner described above with respect to FIG. 9. In response to requests for data by the MCP 810, the QoS engine 808 transmits the ordered data to the MCP 810.

Figure 11:
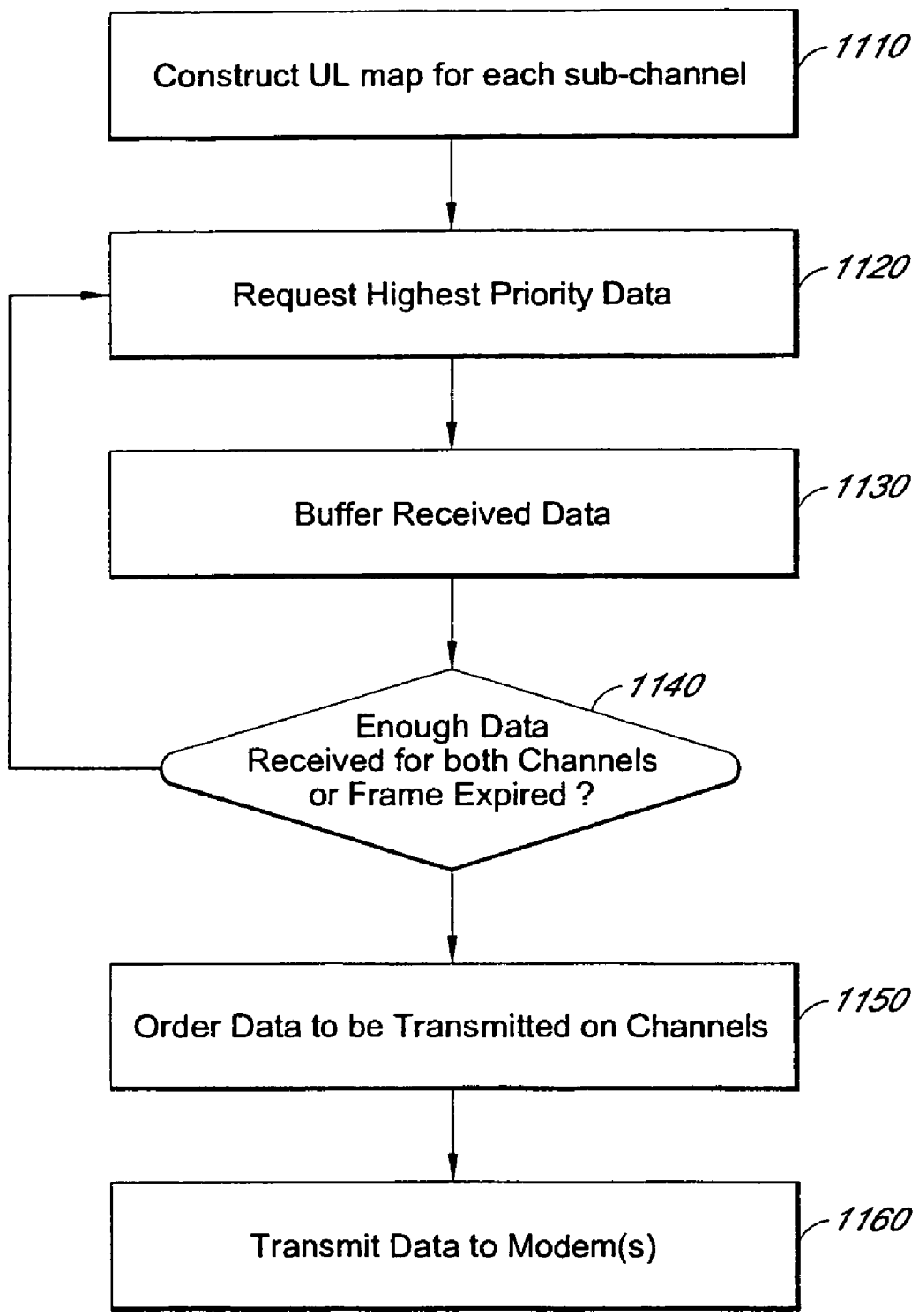
FIG. 11 is a flow chart illustrating the operation of the control module in receiving data from the I/O module, organizing the data for transmission, and transmitting the data to Modem A and Modem B.

FIG. 11 is a flow chart illustrating the operation of the control module 732 in receiving data from the I/O module 750, organizing the data for transmission, and transmitting the data to Modem A 512A and Modem B 512B.

In step 1110, at least one of the MAC's 804A and 804B construct UL maps for each of channel A and channel B. In an advantageous embodiment, only one of the MAC's 804 in a double wide base station 110 generates UL maps for both of the channels A and B. For example, with respect to FIG. 8, the MAC 804A may generate UL maps for both channels A and channel B. In another embodiment, the MAC 804A generates an UL map for channel A and MAC 804B generates an UL map for channel B. In an advantageous embodiment having a base station 510 (FIG. 5A) that transmits a single double wide channel, a single MAC 804 is used to construct the UL maps for both channels A and B. In an embodiment having a base station 520 (FIG. 5B) that transmits two independent single wide channels, two MACs 804 may be used to construct UL maps for respective channels or, alternatively, separate MACs 804 may be used to construct UL maps for their respective channels. The following text describes the case where a single MAC 804A (could be either MAC 804A or MAC804B) generates UL maps for both channels In an advantageous embodiment, the UL maps are generated for the next frame based on requests from CPEs for uplink bandwidth. Using these requests, the MAC 804A reconstructs a logical picture of the state of the queues. Based on this logical view of the set of queues, the MAC 804A allocates uplink bandwidth to the requesting CPE's 120. The uplink map allocates a certain amount of bandwidth to a particular CPE 120, starting at a certain point in the next frame. The particular CPE 120 then allocates this bandwidth across its connections. Due to the dynamic nature of bandwidth allocation, the allocations are constantly changing, such that a CPE 120 may receive unsolicited modifications to the bandwidth granted on a frame by frame basis. If a CPE 120 is allocated less bandwidth for a frame than is necessary to transmit all waiting data, the particular CPE 120 must use its' QoS and fairness algorithms to service its queues.

Because the MAC 804A generates the uplink maps for each of the channels A and B, data allocation for double wide CPE's may be considered. More particularly, a double wide CPE 120 having a high priority (as determined by the prioritizing scheme used by the QoS engine 808) may be allocated uplink bandwidth on both channels of one or more frames. In this way, the bandwidth of uplink communication from double wide CPE's may be increased, while remaining within applicable industry and regulatory standards.

Moving to a step 1120, each of the MAC Co-processors 810 requests the highest priority data from the QoS engine 808 to be inserted in a downlink frame. In an advantageous embodiment, the QoS engine 808 responds based upon the QoS and traffic parameters of the destination CPE's 120, the destination connections and/or services beyond the CPE's 120, and a determined fairness algorithm.

Continuing to a step 1130, the highest priority data received from the QoS engine 808 is stored in a buffer. Data packets may be sorted in the buffer according to any combination of modulation type, FEC type, CPE index, and end user connection ID. For example, in one embodiment data packets may be sorted first according to modulation type, then according to CPE ID, and finally according to end user connection ID. However, the sorting criteria may vary for different embodiments, such that data may be buffered according to any available set of criteria. As another example, data may be sorted first by connection ID, then viewing each connection's data as a single entity, sort these fewer larger chunks by CPE ID, then viewing each CPE's data as a single entity, sort these fewer larger chunks by modulation. In another embodiment, data packets may only be sorted according to FEC type.

In an advantageous embodiment, the buffer separately stores data for each of channel A and channel B. For example, if the data received from the QoS engine 808 is for a single-wide CPE 120 on channel A, the data is buffered in a portion of the buffer, or separate buffer, for transmission on channel A (referred to as "the channel A buffer"). In one embodiment, the data stored in the channel A buffer is buffered according to the PHY mode for channel A. Similarly, if the data received from the QoS engine 808 is for a single-wide CPE 120 on channel B, the data is buffered in a portion of the buffer, or separate buffer, for transmission on channel B (referred to as "the channel B buffer"). Again, the data buffered for channel B may be buffered according to PHY mode for channel B.

If the data received from the QoS engine 808 is for a double wide CPE 120, the data may be buffered in either of the channel A or channel B buffer. In one embodiment, the buffered data for a double wide CPE 120 is ordered for transmission of both channels A and B (step 1150) and transmitted on both channels (step 1160), where some packets from the double wide CPE 120 are transmitted on channel A and other packets are transmitted on channel B. Alternatively, portions of the data received for a particular double wide CPE 120 may be stored in either of the channel A and channel B buffers so that the data for a double wide CPE 120 is split among the two channels as it is being buffered. In either case, the time order of the data transmitted to double wide CPE's 120 on both channel should be maintained and the algorithm for determining the time order of CPE data blocks 432 (FIG. 4) in either channel should be followed by both the base station 110 and the double wide CPE 120. The description of FIG. 9 explains one exemplary algorithm for buffering data on separate channels so that communication with single wide and double wide CPE's 120 is possible.

Proceeding to a step 1140, the MCP's 810 determine if sufficient data has been stored in the respective channel A and B buffers to fill the downlink frames for channels A and B. In an advantageous embodiment, if channel A's current downlink subframe can be filled entirely with data for CPE's having single wide channels, but channel B is not yet full, the QoS engine 808 does not provide any further data for single wide CPE's on channel A and the process returns to step 1120. Accordingly, when the process returns to step 1120, only data for channel B will be retrieved from the QoS engine 808. Similarly, if channel B's current downlink subframe can be filled entirely with data for CPE's having single wide channels, but channel A is not yet full, the QoS engine 808 does not provide any further data for single wide CPE's on channel B and the process returns to step 1120. When the process then returns to step 1120, only data for channel A will be retrieved from the QoS engine 808.

When enough data has been received to fill both channels A and B, the process continues to step 1150. In an advantageous embodiment, at step 1140 one, or both, of the MCP's 810 determine if a frame has expired before enough data has been buffered to fill both channels A and B. In an advantageous embodiment, the communications system 100 uses a constant, known time frame in order to keep all base stations 110 and CPE's 120 in the network synchronized. In the event that the buffer is not completely full when the timeout (e.g., one millisecond) has occurred, the data already in the buffer must be sent in order to preserve the synchronicity of the system. In one embodiment, if the buffer is not full when a timeout has occurred, the modem pads the empty data blocks with fill cells or bytes in order to preserve the timing between frames of data. In another embodiment, the MCP's 810 pad the empty data blocks in one or both of the channel A and channel B buffers, as needed, before sending the data frame to the modem (step 1160).

Continuing to a step 1150, the single-wide data for each of channels A and B is ordered by PHY mode, being certain to maintain time order of all data for particular connections or services. Additionally, the double-wide data is ordered by PHY mode, being certain to maintain time order of data within a service. In one embodiment, the double wide data is arranged in the proper time order irrespective of the channels, and then the data is inserted into the correct PHY mode portion of each channel. In an advantageous embodiment, the data for double wide channels is arranged according to the determined algorithm that both the base station 110 and double wide CPE 120 are following. As described above, one algorithm for maintaining the proper time order among CPE data blocks 432 (FIG. 4) for double channel data is to place earlier in time data on channel A and later in time data on channel B. The receiving CPE 120 may then assemble the CPE data blocks 432 with blocks from channel A first and then the blocks from channel B.

Proceeding to a step 1160, the ordered data for each of channels A and B is transmitted to their corresponding modems 512A and 512B. As a result of the preceding steps, the data now includes all of the information necessary for the modems 512 to correctly send the data such that each receiving CPE 120 may efficiently receive their respective data.

Figure 12:
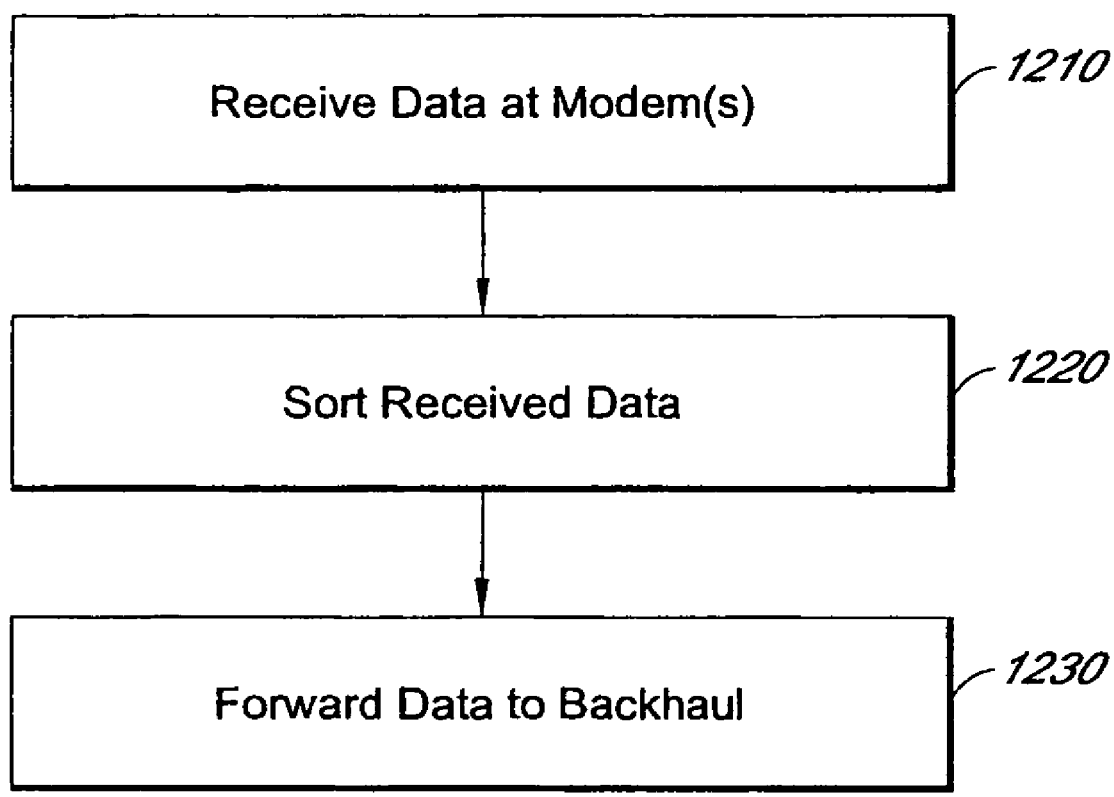
FIG. 12 is a flow chart illustrating the steps performed by a base station during the uplink subframe.

FIG. 12 is a flow chart illustrating the steps performed by a base station 110 during the uplink subframe. In general, the base station 110 receives data on both of the channels A and B, orders the CPE data blocks in the received uplink subframe, and transmits the user data to the backhaul.

Starting at a step 1210, the modems 512 receive data on their respective channels. In accordance with the systems and methods described herein, some double wide CPE's 120 are configured to transmit simultaneously on both channel A and channel B. Accordingly, the data transfer bitrate for transmission from a double wide CPE 120 is double the bitrate for a single wide CPE 120. Additionally, because the communication system 100 uses standards and regulation compliant channels that are supported by currently available equipment, the base station 110 is also able to communicate with single wide CPE's 120. In one embodiment, the data received by the modems 512 includes data from single wide CPE's 120 (on either of channel A or channel B), as well as double wide CPE's 120 (on both channel A and channel B).

In a step 1220, the received data is sorted according to the source connection or service. In one embodiment, sorting of the CPE data blocks 432 (FIG. 4) received in a single channel entails buffering the data received on the single channel in the order received. However, because data from a double wide CPE 120 may be received simultaneously on both channels, the base station 110 must have some algorithm for determining the proper order of the received data. In one embodiment, for all CPE data blocks 432 received from a particular CPE 120 in a frame, the data received on channel A from the particular CPE 120 is buffered first, in the order received, and then data received on channel B from the particular CPE 120 is buffered, in the order received. Those of skill in the art will recognize that other methods of ordering data split among two communication channels may be implemented according to the systems and methods described herein. For example, each CPE data block 432 may include a sequence identification number, indicating the proper ordering of CPE data blocks 432 from a particular CPE 120.

Moving to a step 1230, a forwarding module forwards the ordered data to the proper location. In one embodiment, the forwarding module determines if the data is protocol data or user data to be forwarded to the I/O interface 750. This determination may be accomplished using a connection ID, for example. If the data is protocol data, the data may be forwarded to MAC 804 for processing. Alternatively, if the data is user data which eventually needs to reach the backhaul 616, the data may be forwarded to the I/O interface 750.

Figure 13:
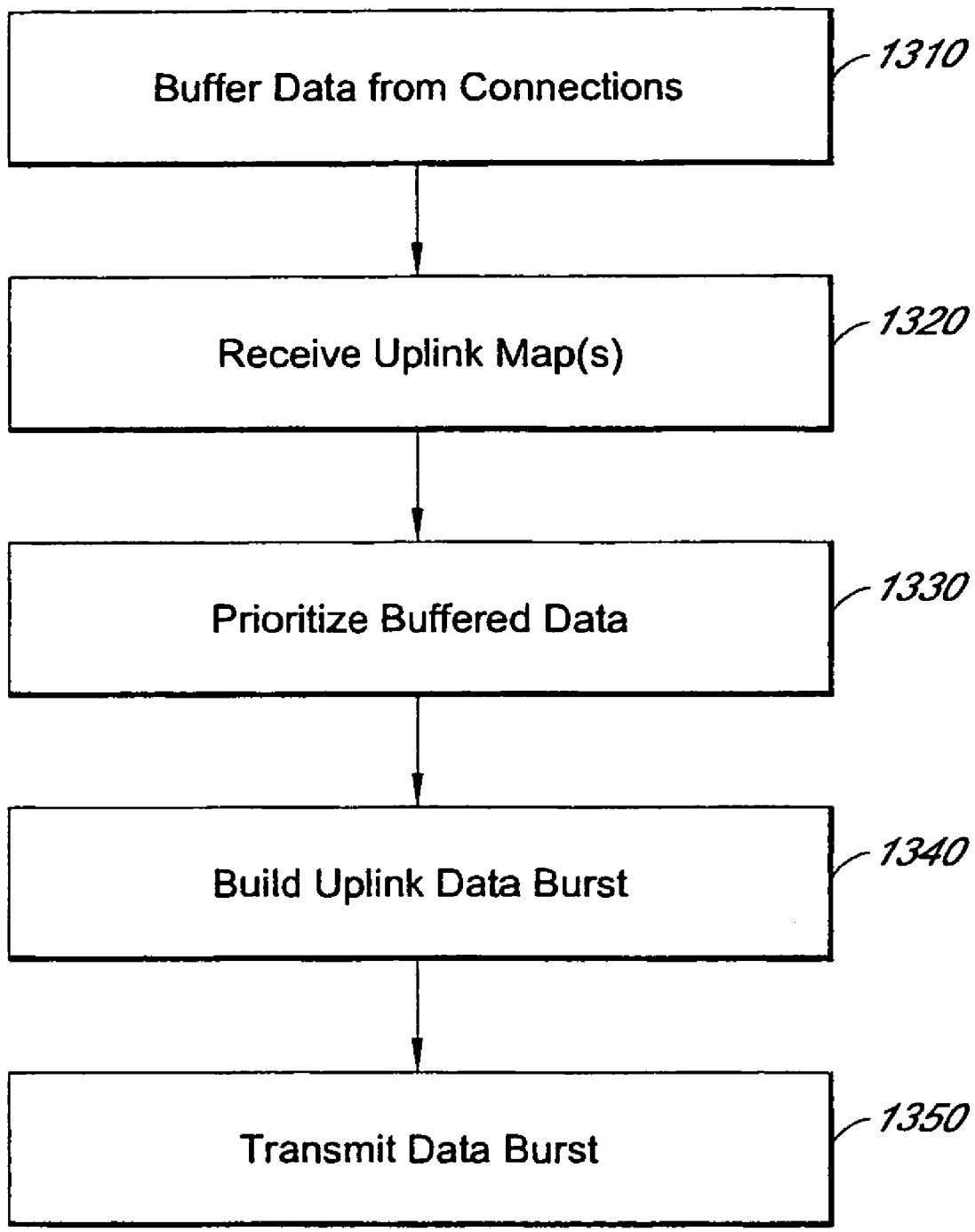
FIG. 13 is a flow chart illustrating the steps performed by a CPE in organizing and transmitting data to a base station 110.

FIG. 13 is a flow chart illustrating the steps performed by a CPE 120 in organizing and transmitting data to a base station 110.

Beginning at a step 1310, data is received from the one or more connections in communication with the CPE 120. The data may be buffered at the CPE 120 according to the class of service of each connection or some other factors, such as order received.

Continuing to a step 1320, with data waiting in a buffer for uplink, the CPE 120 receives the uplink map(s) in order to determine how much uplink bandwidth has been allocated to the particular CPE 120. In one embodiment, a double wide CPE receives two maps, one for each sub-channel. The use of a separate uplink map for each sub-channel maintains standards compliance and keeps single-wide CPEs oblivious to the double-wide CPEs. Additionally, the use of separate uplink maps for each sub-channel allows each sub-channel to be scheduled independently in the uplink, so a CPE's allocation on sub-channel A may be at a different time in the frame than it's allocation on sub-channel B. In an advantageous embodiment, any single-wide CPEs receive the UL map for the sub-channel on which they are communicating. In another embodiment, each of the CPE's 120 receives the uplink map for each of the channels A and B. In another embodiment, a double-wide CPE receives an uplink map that provides bandwidth in both channels of a subsequent frame. The CPE 120 may then determine how much data, at the specific CPE's modulation, can fit in the allocated bandwidth in each of the channels.

Moving to a step 1330, the CPE 120 prioritizes the data stored in the buffer. Using the priorities that are commonly determined for each connection upon registration of the connection with the CPE 120, and in consideration of the amount of allotted uplink bandwidth, the CPE 120 prioritizes the data using a strict or modified-strict priority, fair weighted, round robin or other prioritizing scheme. In one embodiment, a buffer at the CPE 120 includes a prioritized portion which is used to store the prioritized data that is ready for uplink. In another embodiment, the buffer does not move the prioritized data to a different section, but instead sorts a series of pointers that indicate the locations of data stored in the buffer.

Continuing to a step 1340, the CPE 120 builds an uplink data burst that will fill the time allotted to the specific CPE 120 in the uplink subframe. If the CPE 120 is a double wide CPE 120, the CPE 120 builds an uplink data burst that fills the allotted time in channel A and channel B. In order for the data to be properly received by the base station, the CPE 120 must follow the received UL maps for channels A and B. Thus, in any given frame, the UL maps could indicate that a particular double-wide CPE receives an allocation on both A and B, or only A, or only B, or neither. Accordingly, even a double-wide CPE may not always be able to transmit on both channels. In an advantageous embodiment, the UL maps are dynamic, based on priorities and QoS requirements for CPE's 120 in a given sector, so that the allocation of UL bandwidth for a particular CPE 120 may be adjusted on a frame by frame basis. The data burst is built using data pulled from the prioritized portion of the buffer, in a similar fashion as described above with respect to the base station 110. While building the data burst, the CPE 120 may use any combination of packing, payload header suppression, and fragmentation.

Moving to a step 1350, the data bust is transmitted at the time allocated in the uplink map. For a double wide CPE 120, data may be transmitted simultaneously on both channels A and B. For a single wide CPE 120, data is transmitted in a single channel with no modifications to the operation of the CPE 120 due to the fact that the base station 110 and other CPE's 120 are configured to communicate using double wide channels.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should be not taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method, comprising:
identifying, by a base station, each of a plurality of receivers as belonging to either a first category of receivers configured to receive data on a channel A, a second category of receivers configured to receive data on a channel B, or a third category of receivers configured to receive data on both the channel A and the channel B;
buffering, by the base station, data for transmission to the plurality of receivers into either a first port, a second port, or a third port according the identified category, the first port corresponding to the first category, the second port corresponding to the second category, and the third port corresponding to the third category;
generating a channel A data frame for transmission on the channel A by pulling data from the first port and the third port until the channel A data frame is full; and generating a channel B data frame for transmission on the channel B by pulling data from the second port and the third port until the channel B data frame is full.

2. The method of claim 1, further comprising:
receiving, by the base station, data to be transmitted to the plurality of receivers;
determining, by the base station, a bandwidth configuration of said plurality of receivers to determine the category of each of the receivers; and
simultaneously transmitting, by the base station, the channel A data frame and the channel B data frame.

3. The method of claim 2, wherein the transmitting the channel A data frame is performed by a first radio of the base station and the transmitting channel B data frame is performed by a second radio of the base station.

4. The method of claim 2, wherein the transmitting the channel A data frame and the channel B data frame is performed by a single radio of the base station.

5. An apparatus, comprising:
means for identifying individual ones of a plurality of customer premises equipment (CPE) stations as belonging to either a first group, a second group, or a third group;
means for buffering data for transmission to the first group into a first port, for buffering data for transmission to the second group into a second port, and for buffering data for transmission to the third group into a third port;
means for filling a channel A data frame, for transmission on a channel A, with the data from the first port and the third port until the channel A data frame is full; and
means for filling a channel B data frame, for transmission on a channel B, with the data from the second port and the third port until the channel B data frame is full.

6. A base station, comprising:
one or more transmitters;
an input/output module; and
a control module coupled between the one or more transmitters and the input/output module and configured to:
identify individual ones of customer premises equipment (CPE) stations as belonging to either a first group, a second group, or a third group;
receive data from the input/output module, the data including first data for transmission to one or more of the CPE stations in the first group, second data for transmission to one or more of the CPE stations in the second group, and third data for transmission to one or more of the CPE stations in the third group;
buffer the first data into a first port, buffer the second data into a second port, and buffer the third data into a third port;
generate a channel A data frame for transmission on a channel A by pulling the first data from the first port and a portion of the third data from the third port until the channel A data frame is full; and
generate a channel B data frame for transmission on a channel B by pulling the second data from the second port and a portion of the third data from the third port until the channel B data frame is full.

7. The base station of claim 6, wherein the channel A and the channel B each have a bandwidth of about 25 MHz.

8. The base station of claim 6, further comprising:
a first radio configured to transmit or receive on the channel A; and
a second radio configured to transmit or receive on the channel B.

9. The base station of claim 6, further comprising a radio configured to transmit the channel A data frame on the channel A and to transmit the channel B data frame on the channel B.

10. The base station of claim 6, further comprising:
a first receiver to receive a first data frame on the channel A, the first data frame including data from the first group and the third group; and
a second receiver to receive a second data frame, the second data frame including data from the second group and the third group, wherein the first and second data frames are received substantially contemporaneously.

11. The base station of claim 6, wherein the one or more transmitters include:
a first modem to modulate the channel A data frame for transmission on the channel A; and
a second modem configured to modulate the channel B data frame for transmission on the channel B;
wherein the base station further comprises an intermediate frequency module coupled to the first and second modems to convert one or more signals for transmission at an intermediate frequency signal level.

12. The base station of claim 11, wherein the one or more transmitters include:
a first radio to transmit on the channel A based, at least in part, on the intermediate frequency signal level; and
a second radio to transmit on the channel B based, at least in part, on the intermediate frequency signal level.

13. The base station of claim 11, further comprising a radio to transmit data on the channel A and to transmit data on the channel B based, at least in part, on the intermediate frequency signal level.

14. The base station of claim 6, further comprising a sectored active antenna array coupled to the one or more transmitters.

15. The base station of claim 6, wherein the control module includes a media access control module (MAC) configured to allocate available uplink and/or downlink bandwidth on the channel A and the channel B.

16. The apparatus of claim 5, further comprising:
means for receiving data to be transmitted to the plurality of CPE stations;
means for determining a bandwidth configuration of said plurality of CPE stations to determine which of the first, second, or third groups each CPE station belongs to; and
means for transmitting the channel A data frame and the channel B data frame.

17. The apparatus of claim 5, further comprising means for receiving bandwidth requests from the plurality of CPE stations and for allocating bandwidth in the channel A and/or the channel B according to those requests.

18. The apparatus of claim 17, wherein said means for allocating allocates bandwidth according to quality of service parameters associated with the plurality of CPE stations.

* * * * *